United States Patent
Kumazaki et al.

(12) 
(10) Patent No.: US 8,092,331 B2
(45) Date of Patent: Jan. 10, 2012

(54) ELECTRIC OIL PUMP CONTROL APPARATUS FOR VEHICLE, ELECTRIC OIL PUMP CONTROL METHOD FOR VEHICLE, AND SHIFT APPARATUS

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 948 days.

(21) Appl. No.: 12/076,920

(22) Filed: Mar. 25, 2008

(65) Prior Publication Data

US 2008/0242464 A1    Oct. 2, 2008

(30) Foreign Application Priority Data

Mar. 28, 2007   (JP) .................................. 2007-085734

(51) Int. Cl.
*B60W 20/00* (2006.01)
*F16H 59/70* (2006.01)

(52) U.S. Cl. ............. 475/136; 477/4; 477/116; 903/904

(58) Field of Classification Search ................. 903/904; 477/116, 4; 475/136
See application file for complete search history.

(56) References Cited

U.S. PATENT DOCUMENTS

| | | | |
|---|---|---|---|
| 3,938,409 A * | 2/1976 | Uozumi | 477/159 |
| 2002/0091034 A1 * | 7/2002 | Nakamori et al. | 477/3 |
| 2011/0070999 A1 * | 3/2011 | Soliman et al. | 477/3 |

FOREIGN PATENT DOCUMENTS

| | | |
|---|---|---|
| JP | A-05-010431 | 1/1993 |
| JP | A-07-174218 | 7/1995 |
| JP | A-2000-018377 | 1/2000 |
| JP | A-2000-318492 | 11/2000 |
| JP | A-2000-356148 | 12/2000 |
| JP | A-2001-032917 | 2/2001 |
| JP | A-2002-206630 | 7/2002 |
| JP | A-2003-240110 | 8/2003 |
| JP | A-2004-028332 | 1/2004 |
| JP | A-2006-138426 | 6/2006 |

OTHER PUBLICATIONS

Sep. 27, 2011 Office Action issued in Japanese Patent Application No. 2007-085734, with translation.

* cited by examiner

*Primary Examiner* — Sherry Estremsky
(74) *Attorney, Agent, or Firm* — Oliff & Berridge, PLC

(57) ABSTRACT

When the shift position is changed to the drive position, the amount of oil that is supplied to an automatic shift unit is increased by a larger amount as the standby hydraulic pressure is lower. Therefore, even if the standby hydraulic pressure is decreased, the required hydraulic pressure is more easily achieved when the shift position is changed to the drive position. Therefore, it is possible to decrease the standby hydraulic pressure without slowing down the response to the automatic shift unit to the hydraulic pressure and reducing the useful life of the automatic shift unit. Thus, the amount of electricity consumed by the electric oil pump is reduced. As a result, it is possible to enhance the fuel efficiency.

18 Claims, 12 Drawing Sheets

FIG.2

|     | C0 | C1 | C2 | B0 | B1 | B2 | B3 | GEAR RATIO | STEP |
|-----|----|----|----|----|----|----|----|------------|------|
| 1st | ◎  | ○  |    |    |    |    | ○  | 3.357      | 1.54 |
| 2nd | ◎  | ○  |    |    |    | ○  |    | 2.180      | 1.53 |
| 3rd | ◎  | ○  |    |    | ○  |    |    | 1.424      | 1.42 |
| 4th | ◎  | ○  | ○  |    |    |    |    | 1.000      | 1.42 |
| 5th |    | ○  | ○  | ◎  |    |    |    | 0.705      | TOTAL 4.76 |
| R   |    |    | ○  |    |    |    | ○  | 3.209      |      |
| N   |    |    |    |    |    |    |    |            |      |

○ APPLIED  ◎ APPLIED IN STEPPED SHIFT MODE / RELEASED IN CONTINUOUSLY VARIABLE SHIFT MODE

ELECTRIC OIL PUMP CONTROL APPARATUS FOR VEHICLE, ELECTRIC OIL PUMP CONTROL METHOD FOR VEHICLE, AND SHIFT APPARATUS

INCORPORATION BY REFERENCE

The disclosure of Japanese Patent Application No. 2007-085734 filed on Mar. 28, 2007 including the specification, drawings and abstract is incorporated herein by reference in its entirety.

BACKGROUND OF INVENTION

1. Field of the Invention

The invention relates to an electric oil pump control apparatus for a vehicle, which includes an electric oil pump and a application device that is driven by a hydraulic pressure supplied from the electric oil pump, and with which the response of the application device provided in a shift mechanism to the hydraulic pressure and the useful life of the application device are improved, the invention also relating to an electric oil pump control method.

2. Description of the Related Art

Usually, a vehicle is provided with a shift apparatus that is directly or indirectly connected to an engine and that changes the rotational speed of the engine in a stepwise manner or continuously. An example of such shift apparatus is a stepped automatic transmission. The automatic transmission is formed of multiple planetary gear units, and a desired gear is selected by selectively connecting rotational elements of these planetary gear units to each other. The rotational elements are connected to each other by application devices provided in the automatic transmission. The application devices are driven by a hydraulic pressure. The application devices are applied or released by controlling the hydraulic pressure in an appropriate manner.

The hydraulic pressure of the hydraulic fluid supplied from an oil pump is used as the original pressure, and the original pressure is regulated to a desired hydraulic pressure in a hydraulic pressure control circuit of the shift apparatus. Then, the regulated hydraulic pressure is supplied to these application devices. In many cases, an oil pump is provided in the shift apparatus, and driven in accordance with an operation of the engine.

In recent years, hybrid vehicles in which two types of drive power sources, that is, an engine and an electric motor are used in combination, have come on the market. Because both the engine and the electric motor are used, it is possible to utilize the advantages and make up for the disadvantages of each of the engine and the electric motor. With this structure, hybrid vehicles provide good drivability, that is, the hybrid vehicles are driven smoothly and respond quickly to a control. In addition, the hybrid vehicles consume considerably smaller amount of fuel and emit far less exhaust gases than conventionally powered vehicles. If the shift apparatus is provided in such hybrid vehicles, it may be possible to further enhance the drivability and fuel efficiency. In such hybrid vehicles, the engine efficiency is usually low when the vehicle starts moving, when the vehicle is traveling at a low speed and when the vehicle is traveling at a low torque. In such a case, the engine is stopped and the vehicle travels using the drive power produced by the electric motor.

If only a mechanical oil pump that is driven in accordance with an operation of the engine is provided in the above-described hybrid vehicle, the hydraulic pressure is not supplied when the vehicle travels using the drive power produced by the electric motor. This is because the mechanical oil pump is not driven due to a stop of the engine. Especially, in the hybrid vehicle in which the above-described shift apparatus is provided, an appropriate hydraulic pressure is not supplied to the application devices of the shift apparatus. Therefore, the drive power is not transmitted to drive wheels, which makes it impossible for the vehicle to keep traveling. In order to avoid such inconvenience, in the hybrid vehicle provided with the shift apparatus, an electric oil pump is provided in addition to the mechanical oil pump. When the engine is stopped, the electric oil pump is driven to supply a hydraulic pressure to the application devices of the shift apparatus.

The electric oil pump may be provided not only in the hybrid vehicles but also in other types of vehicles. For example, in a control apparatus for a vehicle described in Japanese Patent Application Publication No. 2000-356148 (JP-A-2000-356148), an electric motor (motor generator) is provided between an engine and a torque converter. When the vehicle is traveling using the power from the electric motor, a hydraulic pressure is supplied from the electric oil pump to the shift apparatus.

When the shift position is in a stop position, for example, Neutral, at which the drive power is not transmitted to drive wheels, the control apparatus for a vehicle described in JP-A-2000-356148 stops the engine to stop the mechanical oil pump and drives the electric oil pump to reliably achieve the hydraulic pressure that is supplied to the shift apparatus. Then, when it is predicted that the vehicle will be placed in a stopped state, the output from the electric oil pump is reduced to reduce the amount of electric power consumed to drive the electric oil pump.

However, when the control apparatus described in JP-A-2000-356148 predicts that the vehicle will be maintained in the stop state and therefore keeps low output from the electric oil pump, if the shift position is changed from the stop position to the cruise position, the hydraulic pressure that is supplied to the application device of the shift apparatus does not rise quickly, and slippage of the application device may occur. As a result, the response of the shift apparatus to the hydraulic pressure may be slow down and the useful life of the shift apparatus may be reduced.

SUMMARY OF THE INVENTION

The invention provides an electric oil pump control apparatus for a vehicle, which includes an electric oil pump and a shift mechanism that is driven by a hydraulic pressure supplied from the electric oil pump, and with which the response of the shift mechanism to the hydraulic pressure is improved and reduction in the useful life of the shift mechanism is suppressed. The invention also provides an electric oil pump control method which is applied to the electric oil pump control apparatus.

A first aspect of the invention relates to an electric oil pump control apparatus for a vehicle that includes: an application device; an electric oil pump that supplies a hydraulic pressure to the application device; and a switching device in which the shift position is selectively changed between a drive position for placing a vehicle in the driven state and a non-drive position for placing the vehicle in the non-driven state. The electric oil pump control apparatus includes: a standby hydraulic pressure setting unit that presets at least one of a rotational speed of the electric oil pump and a standby hydraulic pressure which is supplied to the application device when the vehicle is at a standstill; and an oil amount adjustment unit that adjusts the amount of oil which is supplied to the application device when it is predicted or determined that the shift position is changed between the non-drive position and the drive position in the switching device. The oil amount adjustment unit adjusts the amount of oil that is supplied to the application device based on the standby hydraulic pressure.

With the electric oil pump control apparatus according to the first aspect of the invention, the amount of oil that is supplied to the application device is adjusted based on the standby hydraulic pressure when the shift position is changed to the drive position. Thus, even when the standby hydraulic pressure is increased or decreased, the required hydraulic pressure is more easily achieved when the shift position is changed. Therefore, it is possible to increase or decrease the standby hydraulic pressure without reducing the useful life of the application device and slowing down the response of the application device to the hydraulic pressure.

In the first aspect of the invention, when it is predicted or determined that the shift position is changed from the non-drive position to the drive position in the switching device, the oil amount adjustment unit may increase the amount of oil that is supplied to the application device by a larger amount as the standby hydraulic pressure is lower.

Thus, the amount of oil that is supplied to the application device is increased by a larger amount as the standby hydraulic pressure is lower. Therefore, even if the standby hydraulic pressure is low, it is possible to reliably achieve the required hydraulic pressure when the shift position is changed to the drive position.

In the first aspect of the invention, the oil amount adjustment unit may increase at least one of the rotational speed of the electric oil pump and the duration of time the electric oil pump is rotated at an increased rotational speed.

Because at least one of the rotational speed of the electric oil pump and the duration of time the electric oil pump is rotated at an increased rotational speed is increased, it is possible to easily increase the amount of oil that is supplied to the application device.

In the first aspect of the invention, the standby hydraulic pressure setting unit may decrease at least one of the rotational speed of the electric oil pump and the standby hydraulic pressure when there is a low possibility that the shift position is changed from the non-drive position to the drive position in the switching device.

When there is a low possibility that the shift position is changed from the non-drive position to the drive position in the switching device, the standby hydraulic pressure setting unit decreases at least one of the rotational speed of the electric oil pump and the standby hydraulic pressure. Thus, the output from the electric oil pump is suppressed. As a result, it is possible to suppress the electric power consumption.

In the first aspect of the invention, the standby hydraulic pressure setting unit may set at least one of the rotational speed of the electric oil pump and the standby hydraulic pressure based on at least one of the duration of time the selected shift position is maintained at the non-drive position and whether the brake is applied.

At least one of the rotational speed of the electric oil pump and the standby hydraulic pressure is set based on at least one of the duration of time the selected shift position is maintained at the non-drive position and whether the brake is applied. Therefore, it is possible to relatively accurately reflect the drive's intention on the control.

In the first aspect of the invention, the application device may be included in a shift mechanism, and the application state of the application device may be controlled based on the shift position selected in the switching device.

Thus, an appropriate hydraulic pressure is supplied to the application device based on the shift position selected in the switching device and the application state of the application device is appropriately controlled. Therefore, it is possible to appropriately control the operating state of the shift mechanism.

A second aspect of the invention relates to an electric oil pump control method for a vehicle that includes: an application device; an electric oil pump that supplies a hydraulic pressure to the application device; and a switching device in which a shift position is changed between a drive position for placing a vehicle in a driven state and a non-drive position for placing the vehicle in a non-driven state. The electric oil pump control method includes: presetting a standby hydraulic pressure that is supplied to the application device when the vehicle is at a standstill; predicting or determining whether the shift position is changed between the non-drive position and the drive position in the switching device; adjusting the amount of oil that is supplied to the application device depending on the result of prediction or determination as to whether the shift position is changed between the non-drive position and the drive position in the switching device; and adjusting the amount of oil that is supplied to the application device based on the standby hydraulic pressure.

With the electric oil pump control method according to the second aspect of the invention, the amount of oil that is supplied to the application device is adjusted based on the standby hydraulic pressure when the shift position is changed to the drive position. Thus, even when the standby hydraulic pressure is increased or decreased, the required hydraulic pressure is more easily achieved when the shift position is changed. Therefore, it is possible to increase or decrease the standby hydraulic pressure without reducing the useful life of the application device and slowing down the response of the application device to the hydraulic pressure.

A third aspect of the invention relates to a shift apparatus for a vehicle. The shift apparatus includes: an application device that changes the shift mode; an electric oil pump that supplies a hydraulic pressure to the application device; a switching device in which a shift position is selectively changed between a drive position for placing a vehicle in a driven state and a non-drive position for placing the vehicle in a non-driven state; and a controller that presets a standby hydraulic pressure which is supplied to the application device when the vehicle is at a standstill and that adjusts an amount of oil which is supplied to the application device based on the standby hydraulic pressure when it is predicted or determined that the shift position is changed between the non-drive position and the drive position in the switching device.

With the shift apparatus according to the third aspect of the invention, the amount of oil that is supplied to the application device is adjusted based on the standby hydraulic pressure when the shift position is changed to the drive position. Thus, even when the standby hydraulic pressure is increased or decreased, the required hydraulic pressure is more easily achieved when the shift position is changed. Therefore, it is possible to increase or decrease the standby hydraulic pressure without reducing the useful life of the application device and slowing down the response of the application device to the hydraulic pressure.

BRIEF DESCRIPTION OF THE DRAWINGS

The foregoing and further features and advantages of the invention will become apparent from the following description of an example embodiment with reference to the accompanying drawings, wherein the same or corresponding portions will be denoted by the same reference numerals and wherein:

FIG. 2 is an operation chart showing the relationship between shift operations, which are performed when the hybrid vehicle drive system according to the example embodiment shown in FIG. 1 is made to shift gears in a continuously variable manner or a stepped manner, and the combinations of hydraulic friction application devices that are applied when the shift operations are performed;

DETAILED DESCRIPTION OF EXAMPLE EMBODIMENT

Figure 1:
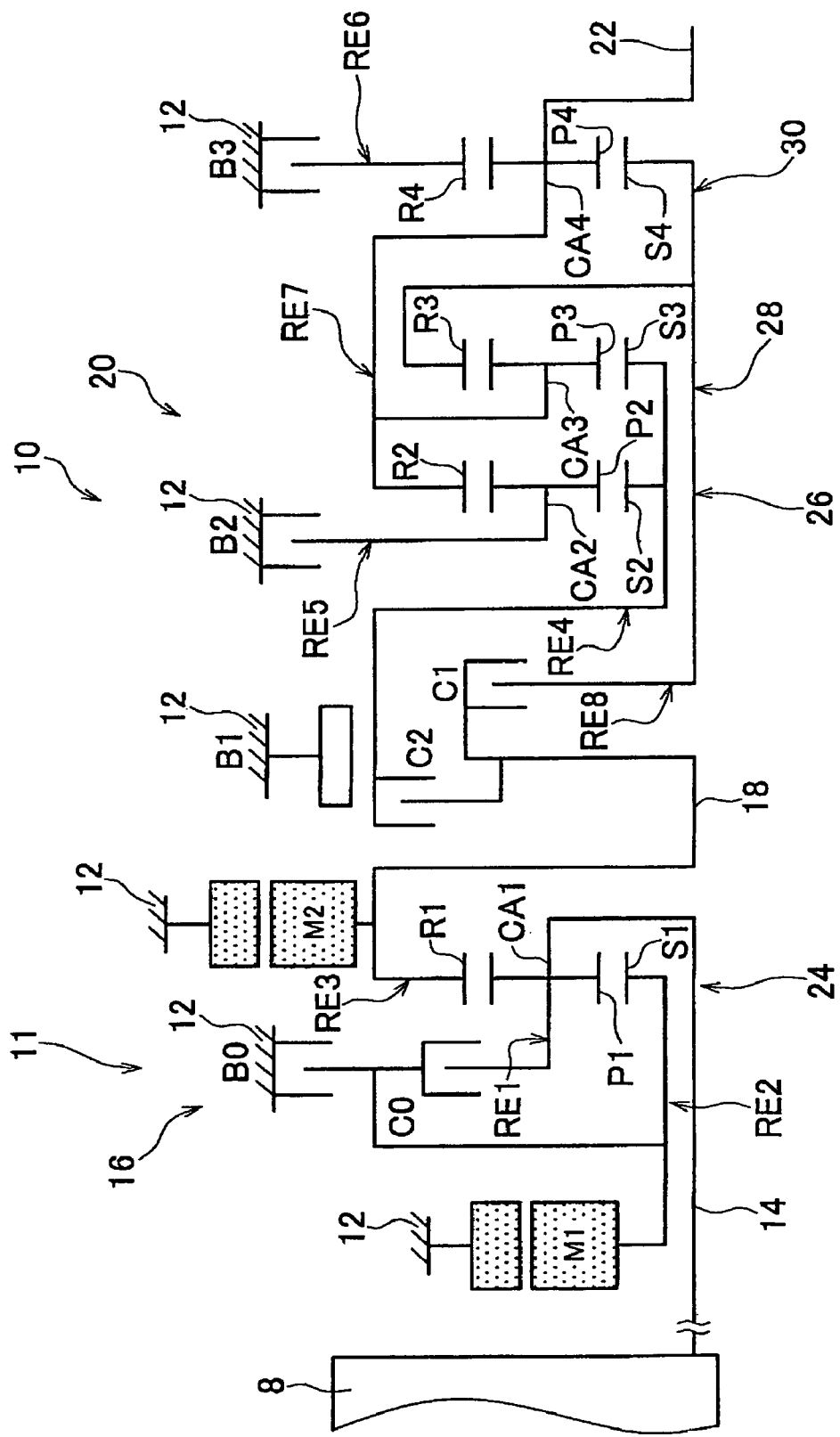
FIG. 1 is a view schematically showing a shift mechanism that constitutes part of a drive system of a hybrid vehicle to which a control apparatus according to an example embodiment of the invention is applied.

FIG. 1 is a view schematically showing a shift mechanism 10 that constitutes part of a drive system of a hybrid vehicle to which a control apparatus according to an example embodiment of the invention is applied. As shown FIG. 1, the shift mechanism 10 includes an input shaft 14, a differential unit 11, an automatic shift unit 20, and an output shaft 22, all of which are coaxially arranged in tandem inside a transmission case 12 (hereinafter, simply referred to as "case 12") which is a non-rotating member that is attached to a vehicle body. The input shaft 14 serves as an input rotating member. The differential unit 11 is either directly connected to the input shaft 14 or connected to the input shaft 14 via a pulsation absorbing damper (vibration damping device), not shown. The automatic shift unit 20 functions as a stepped transmission. The automatic shift unit 20 is arranged in a power transmission path between the differential unit 11 and a pair of drive wheels 38 (see FIG. 6), and is connected to the differential unit 11 via a transmitting member (transmitting shaft) 18. The output shaft 22 is an output rotating member that is connected to the automatic shift unit 20. The shift mechanism 10 is used in, for example, a FR (front-engine, rear-drive) vehicle in which an engine is longitudinally disposed. The shift mechanism 10 is provided between the drive wheels 38 and an engine 8 that is an internal combustion engine, for example, a gasoline engine or a diesel engine, which serves as a drive power source that produces a drive power used to drive the vehicle. The engine 8 is either directly connected to the input shaft 14 or connected to the input shaft 14 via a pulsation absorbing damper, not shown. This shift mechanism 10 transmits the drive power from the engine 8 to the drive wheels 38 via, for example, a differential gear unit (final reduction device) 36 and a pair of axles, in this order, which constitute part of the power transmission path.

Figure 6:
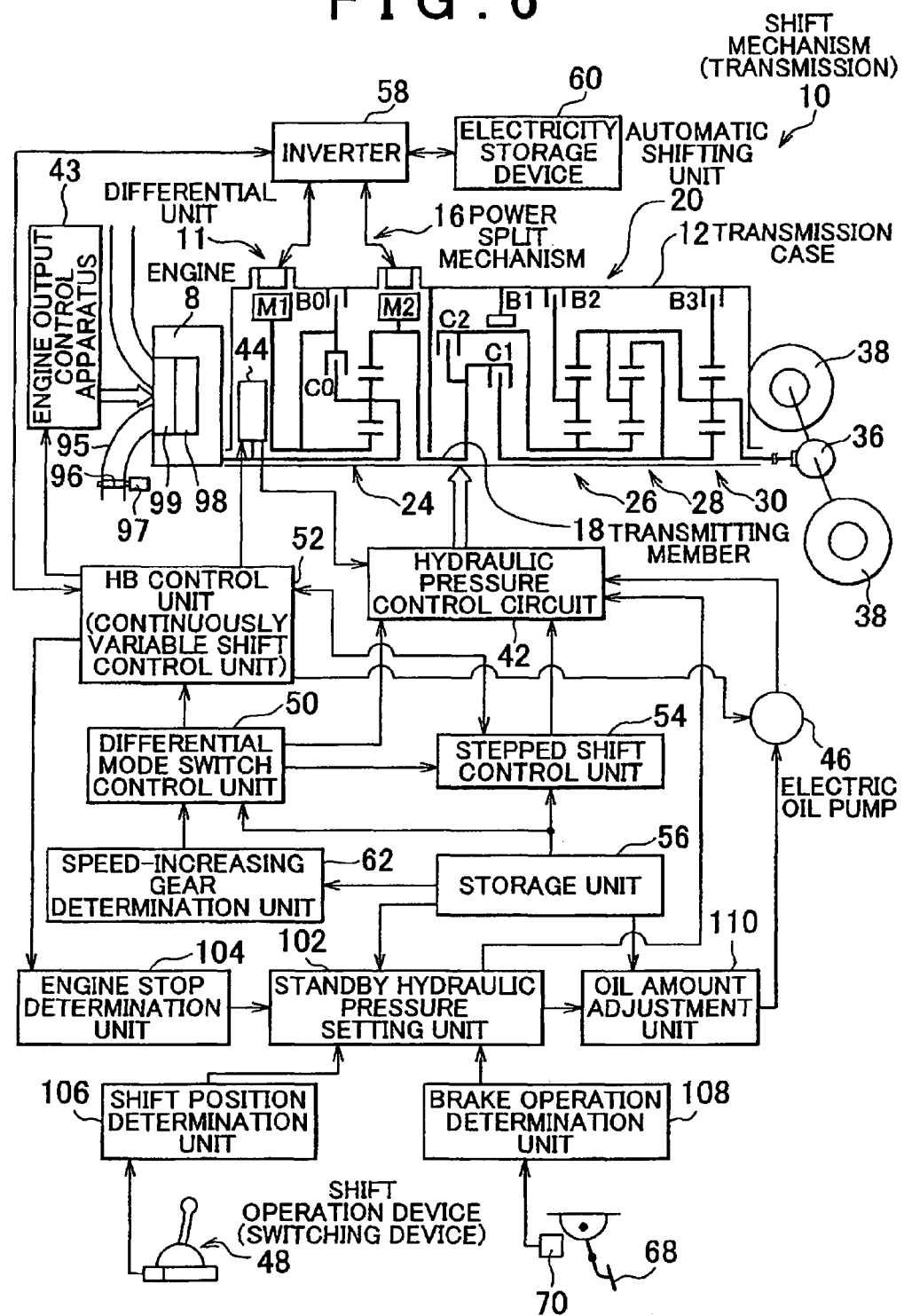
FIG. 6 is a functional block diagram illustrating the main portions of control operations executed by the electronic control unit shown in FIG. 4.

As described above, the engine 8 and the differential unit 11 are directly connected to each other in the shift mechanism 10 of this example embodiment. That is, the engine 8 is connected to the differential unit 11 without provision of a fluid transmission device such as a torque converter or a fluid coupling between the engine 8 and the differential unit 11. Therefore, for example, when the engine 8 is connected to the differential unit 11 via the above-mentioned pulsation absorbing damper, it is regarded that the engine 8 is directly connected to the differential unit 11. Because the configuration of the shift mechanism 10 is symmetric with respect to the axis thereof, the lower portion of the shift mechanism 10 is not shown in FIG. 1. In FIG. 6 as well, the lower portion of the shift mechanism 10 is not shown.

The differential unit 11 includes a first electric motor M1, a power split mechanism 16, and a second electric motor M2. The power split mechanism 16 is a differential mechanism which distributes the drive power output from the engine 8 to the first electric motor M1 and the transmitting member 18. The second electric motor M2 is provided so as to rotate together with the transmitting member 18. The second electric motor. M2 may be provided at any portion in the power transmission path between the transmitting member 18 and the drive wheels 38. The first electric motor M1 and the second electric motor M2 in this example embodiment are both so-called motor-generators that also function as generators. The first electric motor M1 functions as at least a generator (is able to generate electricity) that generates a reaction force, and the second electric motor M2 functions as at least a motor (electric motor) that outputs drive power. The second electric motor M2 serves as a drive power source that produces the drive power used to drive the vehicle.

The power split mechanism 16 mainly includes a single-pinion first planetary gear unit 24 having a predetermined gear ratio ρ1 of, for example, approximately 0.418, a switching clutch C0, and a switching brake B0. The first planetary gear unit 24 includes rotating elements, that is, a first sun gear S1, first pinions P1, a first carrier CA1 which supports the first pinions P1 in such a manner that the first pinions are allowed to rotate about their axes and turn around the first sun gear S1, and a first ring gear R1 that is in mesh with the first sun gear S1 via the first pinions P1. When the number of teeth on the first sun gear S1 is ZS1 and the number of teeth on the first ring gear R1 is ZR1, the gear ratio $\rho1$ is expressed as ZS1/ZR1.

In the power split mechanism 16, the first carrier CA1 is connected to the engine 8 via the input shaft 14, the first sun gear S1 is connected to the first electric motor M1, and the first ring gear R1 is connected to the transmitting member 18. The switching brake B0 is provided between the first sun gear S1 and the case 12, and the switching clutch C0 is provided between the first sun gear S1 and the first carrier CA1. Releasing both the switching clutch C0 and the switching brake B0 enables the three rotating elements of the first planetary gear unit 24, that is, the first sun gear S1, the first carrier CA1, and the first ring gear R1 to rotate relative to each other, thus placing the power split mechanism 16 in the differential mode in which the power split mechanism 16 performs differential operation. Therefore, the drive power output from the engine 8 is distributed to the first electric motor M1 and the transmitting member 18. Part of the drive power output from the engine 8, which is distributed to the first electric motor M1, is used to run the first electric motor M1 to generate electricity. The generated electricity is stored, or used to run the second electric motor M2. Accordingly, the differential unit 11 (power split mechanism 16) functions as an electric differential device. For example, the differential unit 11 may be placed in the so-called continuously variable shift mode (electric CVT mode) and the rotational speed of the transmitting member 18 is continuously changed even when the engine 8 is operating at a constant speed. When the power split mechanism 16 is placed in the differential mode, the differential unit 11 is also placed in the differential mode. Accordingly, the differential unit 11 is placed in the continuously variable shift mode in which the differential unit 11 functions as an electric continuously variable transmission of which the gear ratio $\gamma0$ (rotational speed of the input shaft 14/rotational speed of the transmitting member 18) is continuously changed within a gear ratio range from a minimum value $\gamma0$min to a maximum value $\gamma0$max. In this way, the ratio between the rotational speed of the input shaft 14 that is connected to the engine 8 and the rotational speed of the transmitting member 18 that serves as an output shaft is controlled by the first electric motor M1 and the second electric motor M2.

When the switching clutch C0 or the switching brake B0 is applied, the power split mechanism 16 is placed in the non-differential mode (locked mode) in which the power split mechanism 16 cannot perform the differential operation. More specific description will be provided below. When the switching clutch C0 is applied and therefore the first sun gear S1 and the first carrier CA1 are connected to each other, the power split mechanism 16 is placed in the locked mode in which the three rotating elements of the planetary gear unit 24, that is, the first sun gear S1, the first carrier CA1, and the first ring gear R1 are rotated together, in other words, the power split mechanism 16 is placed in the non-differential mode in which the power split mechanism 16 cannot perform the differential operation. As a result, the differential unit 11 is also placed in the non-differential mode. Also, the rotational speed of the engine 8 matches the rotational speed of the transmitting member 18. Therefore, the differential unit 11 (power split mechanism 16) is placed in the fixed shift mode, that is, the stepped shift mode, in which the differential unit 11 functions as a transmission of which the gear ratio $\gamma0$ is fixed at 1. When the switching brake B0 is applied instead of the switching clutch C0 and therefore the first sun gear S1 is locked to the case 12, the power split mechanism 16 is placed in the locked mode in which the first sun gear S1 is not allowed to rotate, in other words, the power split mechanism 16 is placed in the non-differential mode in which the power split mechanism 16 cannot perform the differential operation. As a result, the differential unit 11 is also placed in the non-differential mode. The first ring gear R1 rotates faster than the first carrier CA1. Therefore, the power split mechanism 16 functions as a speed increasing mechanism, and the differential unit 11 (power split mechanism 16) is placed in the fixed shift mode, that is, the stepped shift mode, in which the differential unit 11 functions as a speed increasing transmission of which the gear ratio $\gamma0$ is fixed at a value less than 1, for example, approximately 0.7.

As described above, the switching clutch C0 and the switching brake B0 in this example embodiment function as differential mode switching devices that selectively switch the shift mode of the differential unit 11 (power split mechanism 16) between the differential mode, i.e., the unlocked mode, and the non-differential mode, i.e., the locked mode. More specifically, the switching clutch C0 and the switching brake B0 function as differential mode switching devices that selectively switch the shift mode of the differential unit 11 (power split mechanism 16) between i) the differential mode in which the differential unit 11 (power split mechanism 16) functions as an electric differential device, for example, the continuously variable shift mode in which the differential unit 11 (power split mechanism 16) functions as an electric continuously variable transmission of which the gear ratio is changed continuously, and ii) the shift mode in which the differential unit 11 (power split mechanism 16) does not perform the electric continuously variable shift operation, for example, the locked mode in which the differential unit 11 (power split mechanism 16) does not function as a continuously variable transmission and the gear ratio is fixed at a predetermined value, namely, the fixed shift mode (non-differential mode) in which the differential unit 11 (power split mechanism 16) functions as a single-speed transmission having one gear ratio or a multi-speed transmission having multiple gear ratios, which cannot perform the electric continuously variable shift operation.

The automatic shift unit 20 constitutes part of the power transmission path from the differential unit 11 to the drive wheels 38, and includes a single-pinion second planetary gear unit 26, a single-pinion third planetary gear unit 28, and a single-pinion fourth planetary gear unit 30. The second planetary gear unit 26 includes a second sun gear S2, second pinions P2, a second carrier CA2 which supports the second pinions P2 in such a manner that the second pinions are allowed to rotate about their axes and turn around the second sun gear S2, and a second ring gear R2 that is in mesh with the second sun gear S2 via the second pinions P2. The second planetary gear unit 26 has a predetermined gear ratio $\rho2$ of, for example, approximately 0.562. The third planetary gear unit 28 includes a third sun gear S3, third pinions P3, a third carrier CA3 which supports the third pinions P3 in such a manner that the third pinions P3 are allowed to rotate about their axes and turn around the third sun gear S3, and a third ring gear R3 that is in mesh with the third sun gear S3 via the third pinions P3. The third planetary gear unit 28 has a predetermined gear ratio $\rho3$ of, for example, approximately 0.425. The fourth planetary gear unit 30 includes a fourth sun gear S4, fourth pinions P4, a fourth carrier CA4 which supports the fourth pinions P4 in such a manner that the fourth pinions P4 are allowed to rotate about their axes and turn around the fourth sun gear S4, and a fourth ring gear R4 that is in mesh with the fourth sun gear S4 via the fourth pinions P4. The fourth planetary gear unit 30 has a predetermined gear ratio ρ4 of, for example, approximately 0.424. When the number of teeth on the second sun gear S2 is ZS2, the number of the teeth on the second ring gear R2 is ZR2, the number of teeth on the third sun gear S3 is ZS3, the number of teeth on the third ring gear R3 is ZR3, the number of teeth on the fourth sun gear S4 is ZS4, and the number of teeth on the fourth ring gear R4 is ZR4, the gear ratio ρ2 is expressed as ZS2/ZR2, the gear ratio ρ3 is expressed as ZS3 ZR3, and the gear ratio ρ4 is expressed as "ZS4/ZR4".

In the automatic shift unit 20, the second sun gear S2 and the third sun gear S3 are connected to each other, and selectively connected to the transmitting member 18 via the second clutch C2. Also the second sun gear S2 and the third sun gear S3 are selectively connected to the case 12 via the first brake B1. The second carrier CA2 is selectively connected to the case 12 via the second brake B2. The fourth ring gear R4 is selectively connected to the case 12 via the third brake B3. The second ring gear R2, the third carrier CA3, and the fourth carrier CA4 are connected to each other, and selectively connected to the output shaft 22. The third ring gear R3 and the fourth sun gear S4 are connected to each other, and selectively connected to the transmitting member 18 via the first clutch C1. In this way, the automatic shift unit 20 and the transmitting member 18 are connected to each other via one of the first clutch C1 and the second clutch C2 which are used to select the gear of the automatic shift unit 20. In other words, the first clutch C1 and the second clutch C2 function as application devices that change the state of the power transmission path which extends between the transmitting member 18 and the automatic shift unit 20, i.e., which extends between the differential unit 11 (transmitting member 18) and the drive wheels 38. The state of the power transmission path is changed between the power transmittable state in which the drive power is allowed to be transmitted along that power transmission path and the power transmission-interrupted state in which transmission of the drive power along that power transmission path is interrupted. That is, applying at least one of the first clutch C1 and the second clutch C2 places the power transmission path in the power transmittable state. Conversely, releasing both the first clutch C1 and the second clutch C2 places the power transmission path in the power transmission-interrupted state.

The switching clutch C0, the first clutch C1, the second clutch C2, the switching brake B0, the first brake B1, the second brake B2, and the third brake B3 are hydraulic friction application devices (which may be regarded as application devices according to the invention) that are used in vehicle stepped automatic transmissions. The clutches may be wet multiple-disc clutches in which a plurality of stacked friction plates are pressed together by a hydraulic actuator, and the brakes may be band brakes in which one end of one or two bands that are wound around the outer peripheral surface of a rotating drum is pulled tight by a hydraulic actuator. Each hydraulic friction application device selectively connects members, located on both sides of the hydraulic friction application device, to each other.

In the shift mechanism 10 structured as described above, gear is selected from among forward gears from first gear through fifth gear, reverse gear, and neutral. The desired gear is selected by selectively applying the switching clutch C0, the first dutch C1, the second clutch C2, the switching brake B0, the first brake B1, the second brake B2, and the third brake B3 in the combination shown in the operation chart in FIG. 2. Thus, the gear ratio γ(=rotational speed $N_{IN}$ of the input shaft/rotational speed $N_{OUT}$ of the output shaft) at each gear is achieved. The ratios between the gear ratios γ of the adjacent gears are substantially equal to each other. In this example embodiment, the power split mechanism 16 is provided with the differential mode switching devices (C0, B0), i.e., the switching clutch C0 and the switching brake B0. The power split mechanism 16 may be placed in the continuously variable shift mode in which the power split mechanism 16 functions as a continuously variable transmission. Alternatively, the power split mechanism 16 may be placed in the fixed shift mode in which the power split mechanism 16 functions as a transmission having a fixed gear ratio, by applying one of the switching clutch C0 and the switching brake B0. Accordingly, the shift mechanism 10 may be placed in the stepped shift mode in which the shift mechanism 10 operates as a stepped transmission using the automatic shift unit 20 and the differential unit 11 that is placed in the fixed shift mode by applying one of the differential mode switching devices (C0, B0). Alternatively, the shift mechanism 10 may be placed in the continuously variable shift mode in which the shift mechanism 10 operates as an electric continuously variable transmission using the automatic shift unit 20 and the differential unit 11 that is placed in the continuously variable shift mode by keeping both of the differential mode switching devices (C0, B0) released. In other words, the shift mechanism 10 is placed in the stepped shift mode by applying one of the differential mode switching devices (C0, B0), and placed in the continuously variable shift mode by keeping both of the differential mode switching devices (C0, B0) released. The differential unit 11 may also be regarded as a transmission that is switched between the stepped shift mode and the continuously variable shift mode.

For example, when the shift mechanism 10 functions as a stepped transmission, one of the gears described below is selected as shown in the operation chart in FIG. 2. First gear that has the highest gear ratio γ1, for example, approximately 3.357, is selected by applying the switching clutch C0, the first clutch C1, and the third brake B3. Second gear that has a gear ratio γ2 lower than that of first gear, for example, approximately 2.180, is selected by applying the switching clutch C0, the first clutch C1, and the second brake B2. Third gear that has a gear ratio γ3 lower than that of second gear, for example, approximately 1.424, is selected by applying the switching clutch C0, the first clutch C1, and the first brake B1. Fourth gear that has a gear ratio γ4 lower than that of third gear, for example, approximately 1.000, is selected by applying the switching clutch C0, the first clutch C1, and the second clutch C2. Fifth gear that has a gear ratio γ5 lower than that of fourth gear, for example, approximately 0.705, is selected by applying the first clutch C1, the second clutch C2, and the switching brake B0. Reverse gear that has a gear ratio γR between the gear ratio of first gear and the gear ratio of second gear, for example, approximately 3.209, is selected by applying the second clutch C2 and the third brake B3. When the automatic shift unit 20 is placed in Neutral, all of the clutches and brakes are released.

However, when the shift mechanism 10 functions as a continuously variable transmission, both the switching clutch C0 and the switching brake B0 are released as shown in the operation chart in FIG. 2. Thus, when the differential unit 11 functions as a continuously variable transmission and the automatic shift unit 20, which is arranged in tandem with the differential unit 11, functions as a stepped transmission, the rotational speed of the transmitting member 18, that is, the rotational speed that is input to the automatic shift unit 20, which is at one of first gear, second gear, third gear, and fourth gear, is continuously changed so that gear ratio of each gear is allowed to change continuously. Accordingly, the gears are changed while the gear ratio is continuously changed. As a result, the total gear ratio γT, which is achieved by the entire shift mechanism 10, is continuously changed. The ratio of the gear ratio at a gear to a gear ratio at an adjacent higher gear (i.e., step) is shown in the section "STEP" in FIG. 2. As shown in the section "TOTAL" in FIG. 2, the ratio of the gear ratio at first gear to the gear ratio at the fifth gear is 4.76.

Figure 3:
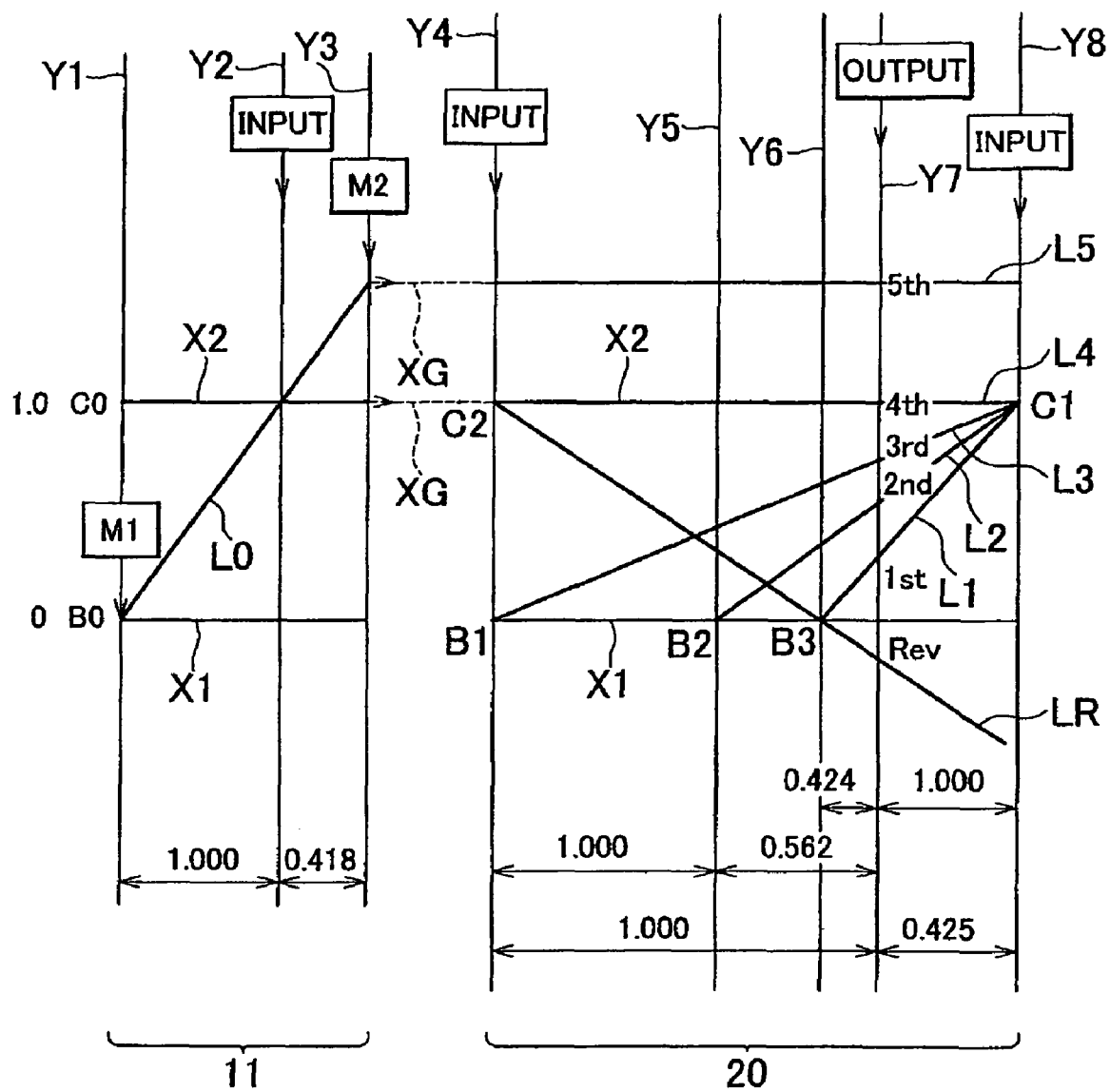
FIG. 3 is a collinear diagram illustrating the relative rotational speed in each gear when the hybrid vehicle drive system according to the example embodiment shown in FIG. 1 is made to shift gears in a stepped manner.

FIG. 3 is a collinear diagram that shows, using straight lines, the correlative relationships among the rotational speeds of the various rotating elements of the shift mechanism 10. The connection states of the rotating elements vary depending on the selected gear. The shift mechanism 10 includes the differential unit 11 that functions as a continuously variable transmission and the automatic shift unit 20 that functions as a stepped transmission. The collinear diagram in FIG. 3 is a two-dimension coordinate system in which the abscissa axis represents the relationship among the gear ratios ρ of the planetary gear units 24, 26, 28, and 30, and ordinate axis represents the relative rotational speeds. Among three horizontal lines, the lower horizontal line X1 represents a rotational speed of zero, the upper horizontal line X2 represents a rotational speed of 1.0, i.e., the rotational speed $N_E$ of the engine 8 that is connected to the input shaft 14, and the horizontal line XG represents the rotational speed of the transmitting member 18.

Also, the three vertical lines Y1, Y2, and Y3 which correspond to the three elements of the power split mechanism 16 that forms the differential unit 11 represent, in order from left to right, the relative rotational speeds of the first sun gear S1 that is regarded as a second rotating element (second element) RE2, the first carrier CA1 that is regarded as a first rotating element (first element) RE1, and the first ring gear R1 that is regarded as a third rotating element (third element) RE3. The interval between the vertical lines Y1 and Y2, and the interval between the vertical lines Y2 and Y3 are determined based on the gear ratio ρ1 of the first planetary gear unit 24. Further, the five vertical lines Y4, Y5, Y6, Y7, and Y8 for the automatic shift unit 20 represent, in order from left to right, the relative rotational speeds of the second sun gear S2 and the third sun gear S3 which are connected to each other and which are regarded as a fourth rotating element (fourth element) RE4, the second carrier CA2 which is regarded as a fifth rotating element (fifth element) RE5, the fourth ring gear R4 which is regarded as a sixth rotating element (sixth element) RE6, the second ring gear R2, the third carrier CA3, and the fourth carrier CA4 which are connected to each other and which are regarded as a seventh rotating element (seventh element) RE7, and the third ring gear R3 and the fourth sun gear S4 which are connected to each other and which are regarded as an eighth rotating member (eighth element) RE8. The interval between the vertical lines Y4 and Y5, the interval between the vertical lines Y5 and Y6, the interval between the vertical lines Y6 and Y7, and the interval between the vertical lines Y7 and Y8 are determined based on the gear ratio ρ2 of the second planetary gear unit 26, the gear ratio ρ3 of the third planetary gear unit 28, and the gear ratio ρ4 of the fourth planetary gear unit 30. In the relationships among the intervals between the vertical lines in the collinear diagram, when the interval between the vertical line corresponding to the sun gear and the vertical line corresponding to the carrier is expressed by "1", the interval between the vertical line corresponding to the carrier and the vertical line corresponding to the ring gear is expressed by the gear ratio ρ of the planetary gear unit. That is, in the coordinate system for the differential unit 11, the interval between the vertical lines Y1 and Y2 is set to an interval corresponding to 1, and the interval between vertical lines Y2 and Y3 is set to an interval corresponding to the gear ratio ρ1. Similarly, in the coordinate system for the automatic shift unit 20, the interval between the vertical line corresponding to the sun gear and the vertical line corresponding to the carrier is set to an interval corresponding to 1, and the interval between the vertical line corresponding to the carrier and the vertical line corresponding to the ring gear is set to an interval corresponding to the gear ratio ρ, at each of the second, third, and fourth planetary gear units 26, 28, and 30.

As illustrated in the collinear diagram in FIG. 3, the shift mechanism 10 in this example embodiment is structured so that the power split mechanism 16 (differential unit 11) transmits the rotation of the input shaft 14 to the automatic shift unit (stepped transmission) 20 via the transmitting member 18 when the first rotating element RE1 (first carrier CA1) of the first planetary gear unit 24 is connected to the engine 8 via the input shaft 14 and is selectively connected to the second rotating element RE2 (first sun gear S1) via the switching clutch C0, the second rotating element RE2 is connected to the first electric motor M1 and is selectively connected to the case 12 via the switching brake. B0, and the third rotating element RE3 (first ring gear R1) is connected to the transmitting member 18 and the second electric motor M2. The relationship between the rotational speed of the first sun gear S1 and the rotational speed of the first ring gear R1 at this time is shown by the sloped straight line L0 that passes through the point of intersection of Y2 and X2.

When the switching clutch C0 and the switching brake 130 are both released, the power split mechanism 16 is placed in the continuously variable shift mode (differential mode). In this case, when the rotational speed of the first sun gear S1, represented by the point of intersection of the straight line L0 and the vertical line Y1, is increased or decreased by controlling the rotational speed of the first electric motor M1, if the rotational speed of the first ring gear R1, which depends on the vehicle speed V, is substantially constant, the rotational speed of the first carrier CA1 represented by the point of intersection of the straight line L0 and the vertical line Y2 is increased or decreased. When the first sun gear S1 and the first carrier CA1 are connected to each other by applying the switching clutch C0, the power split mechanism 16 is placed in the non-differential mode in which the three rotating elements RE1, RE2, and RE3 rotate together. Therefore, the straight line L0 matches the horizontal line X2, and the transmitting member 18 rotates at the same speed as the engine speed $N_E$. Alternatively, when the rotation of the first sun gear S1 is stopped by applying the switching brake B0, the power split mechanism 16 is placed in the non-differential mode in which the power split mechanism 16 functions as a speed increasing mechanism. Therefore, the straight line L0 is brought into the state shown in FIG. 3, and the rotational speed of the first ring gear R1 represented by the point of intersection of the straight line L0 and the vertical line Y3, i.e., the rotational speed of the transmitting member 18, is input in the automatic shift unit 20. At this time, the rotational speed of the transmitting member 18 is higher than the engine speed $N_E$.

In the automatic shift unit 20, the fourth rotating element RE4 is selectively connected to the transmitting member 18 via the second clutch C2, and selectively connected to the case 12 via the first brake B1. The fifth rotating element RE5 is selectively connected to the case 12 via the second brake B2. The sixth rotating element RE6 is selectively connected to the case 12 via the third brake B3. The seventh rotating element RE7 is connected to the output shaft 22. The eighth rotating element RE8 is selectively connected to the transmitting member 18 via the first clutch C1.

When the switching clutch C0, the first clutch C1 and the third brake B3 are applied, first gear is selected. As illustrated in FIG. 3, in the coordinate system for the automatic shift unit 20, the rotational speed of the output shaft 22 in first gear is shown at the point of intersection of i) the sloped straight line L1 that is defined by application of both the first clutch C1 and the third brake B3 and that passes through both the point of intersection of the horizontal line X2 and the vertical line Y8 which represents the rotational speed of the eighth rotating element RE8 and the point of intersection of the horizontal line X1 and the vertical line Y6 which represents the rotational speed of the sixth rotating element RE6, and ii) the vertical line Y7 that represents the rotational speed of the seventh rotating element RE7 which is connected to the output shaft 22. When the switching clutch C0, the first clutch C1 and the second brake B2 are applied, second gear is selected. The rotational speed of the output shaft 22 in second gear is shown at the point of intersection of the sloped straight line L2, which is defined by application of both the first clutch C1 and the second brake B2, and the vertical line Y7 that represents the rotational speed of the seventh rotating element RE7 which is connected to the output shaft 22. When the switching clutch C0, the first clutch C1 and the first brake B1 are applied, third gear is selected. The rotational speed of the output shaft 22 in third gear is shown at the point of intersection of the sloped straight line L3, which is defined by application of both the first clutch C1 and the first brake B1, and the vertical line Y7 that represents the rotational speed of the seventh rotating element RE7 which is connected to the output shaft 22. When the switching clutch C0, the first clutch C1 and the second clutch C2 are applied, fourth gear is selected. The rotational speed of the output shaft 22 in fourth gear is shown at the point of intersection of the horizontal straight line L4, which is defined by application of both the first clutch C1 and the second clutch C2, and the vertical line Y7 that represents the rotational speed of the seventh rotating element RE7 which is connected to the output shaft 22. When each of first-gear, second gear, third gear, and fourth gear is selected, the switching clutch C0 is applied. Therefore, the rotation having the same speed as the engine speed $N_E$ is transmitted from the differential unit 11, i.e., the power split mechanism 16 to the eighth rotating element RE8. However, if the switching brake B0 is applied instead of the switching clutch C0, the rotation having a speed higher than the engine speed $N_E$ is transmitted from the differential unit 11 to the eighth rotating element RE8. Therefore, the rotational speed of the output shaft 22 in fifth gear is shown at the point of intersection of the horizontal straight line L5, which is defined by application of all the first clutch C1, the second clutch C2, and the switching brake B0, and the vertical line Y7 that represents the rotational speed of the seventh rotating element RE7 which is connected to the output shaft 22.

Figure 4:
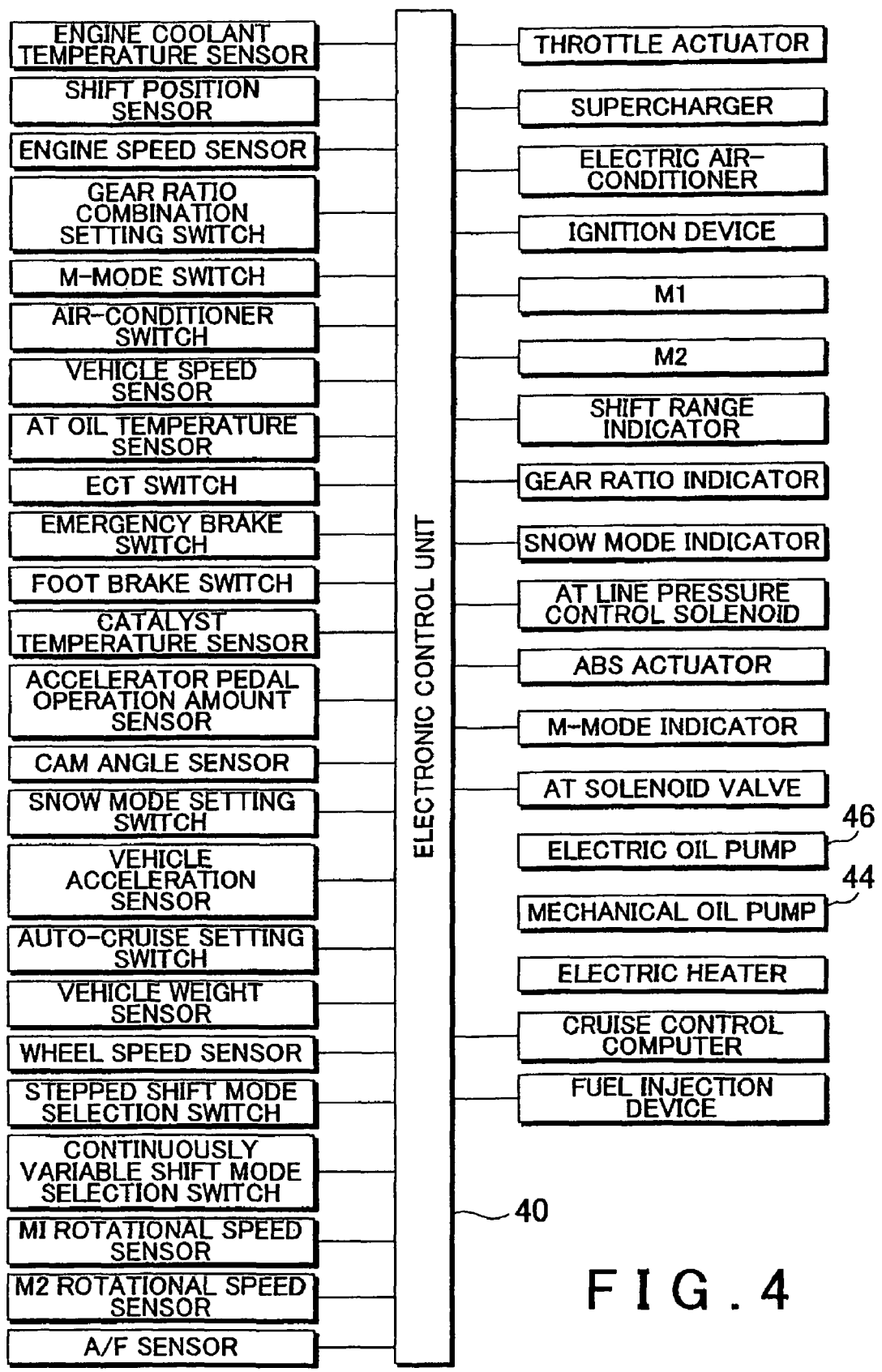
FIG. 4 is a diagram showing signals input in/output from an electronic control unit provided in the drive system according to the example embodiment shown in FIG. 1.

FIG. 4 shows examples of signals input in (received by) and output from an electronic control unit 40 that controls the shift mechanism 10 in this example embodiment. The electronic control unit 40 includes a so-called microcomputer that has a CPU, a ROM, a RAM, an input interface, an output interfaces, etc. The electronic control unit 40 executes drive controls such as shift control over the automatic shift unit 20 and hybrid drive control related to the engine 8 and the first and second electric motors M1 and M2, by processing the signals according to programs prestored in the ROM while using the temporary storage function of the RAM.

Various signals are transmitted to the electronic control unit 40 from various sensors and switches shown in FIG. 4. These signals include a signal indicating an engine coolant temperature $TEMP_W$, a signal indicating a shift position $P_{SH}$, a signal indicating an engine speed $N_E$ which is the rotational speed of the engine 8, a signal indicating a gear ratio combination setting value, a signal indicating a command to select the M-mode (manual shift running mode), a signal indicating operation of an air-conditioner, a signal indicating a vehicle speed V that corresponds to the rotational speed $N_{OUT}$ of the output shaft 22, an AT fluid temperature signal indicating a temperature of the oil in the automatic shift unit 20, a signal indicating operation of an emergency brake, a signal indicating operation of a footbrake, a catalyst temperature signal indicating a catalyst temperature, and an accelerator depression amount signal indicating an accelerator depression amount $A_{CC}$ which corresponds to the amount of drive power required by a driver, a cam angle signal, a snow mode setting signal indicating a snow mode setting, an acceleration signal indicating a longitudinal acceleration of the vehicle, an auto-cruise signal indicating auto-cruise running, a vehicle weight signal indicating a vehicle weight, wheel speed signals indicating wheel speeds, a signal indicating whether a stepped shift mode selection switch, which is used to place the differential unit 11 (power split mechanism 16) in the stepped shift mode (locked mode) to have the shift mechanism 10 function as a stepped transmission, has been operated, a signal indicating whether a continuously variable shift mode selection switch, which is used to place the differential unit 11 (power split mechanism 16) in the continuously variable shift mode (differential mode) to have the shift mechanism 10 function as a continuously variable transmission, has been operated, a signal indicating a rotational speed $N_{M1}$ of the first electric motor M1 (hereinafter, simply referred to as "first electric motor rotational speed $N_{M1}$"), a signal indicating a rotational speed $N_{M2}$ of the second electric motor M2 (hereinafter, simply referred to as "second electric motor rotational speed $N_{M2}$"), and a signal indicating an air-fuel ratio A/F in the engine 8.

The electronic control unit 40 transmits various control signals to an engine output control apparatus 43 (see FIG. 5) to control the drive power output from the engine 8. These control signals include a drive signal provided to a throttle actuator 97 that controls the opening amount $\theta_{TH}$ of an electronically-controlled throttle valve 96 arranged in an intake pipe 95 of the engine 8, a fuel supply amount signal based on which the amount of fuel supplied into the cylinders of the engine 8 from a fuel injection device 98 is controlled, an ignition signal that indicates the ignition timing at which the air-fuel mixture is ignited by an ignition device in the engine 8, and a boost pressure adjusting signal based on which the boost pressure is adjusted, an electric air-conditioner drive signal based on which an electric air-conditioner is operated, command signals based on which the electric motors M1 and M2 are operated, a shift position (operating position) indication signal based on which a shift range indicator is operated, a gear ratio indication signal based on which the gear ratio is indicated, a snow mode indication signal based on which the fact that the vehicle is being operated in the snow mode is indicated, an ABS activation signal based on which an ABS actuator that prevents the wheels from slipping when brakes are applied is actuated, an M-mode indication signal which indicates that the M-mode has been selected, valve command signals based on which electromagnetically-controlled valves in a hydraulic pressure control circuit 42 (see FIG. 5) are actuated to control hydraulic actuators for the hydraulic friction application devices in the differential unit 11 and the automatic shift unit 20, a drive command signal based on which a mechanical oil pump 44 which is a hydraulic pressure source for the hydraulic pressure control circuit 42 and an electric oil pump 46 are operated, a signal based on which an electric heater is driven, and a signal that is provided to a computer used to execute a cruise control.

Figure 5:
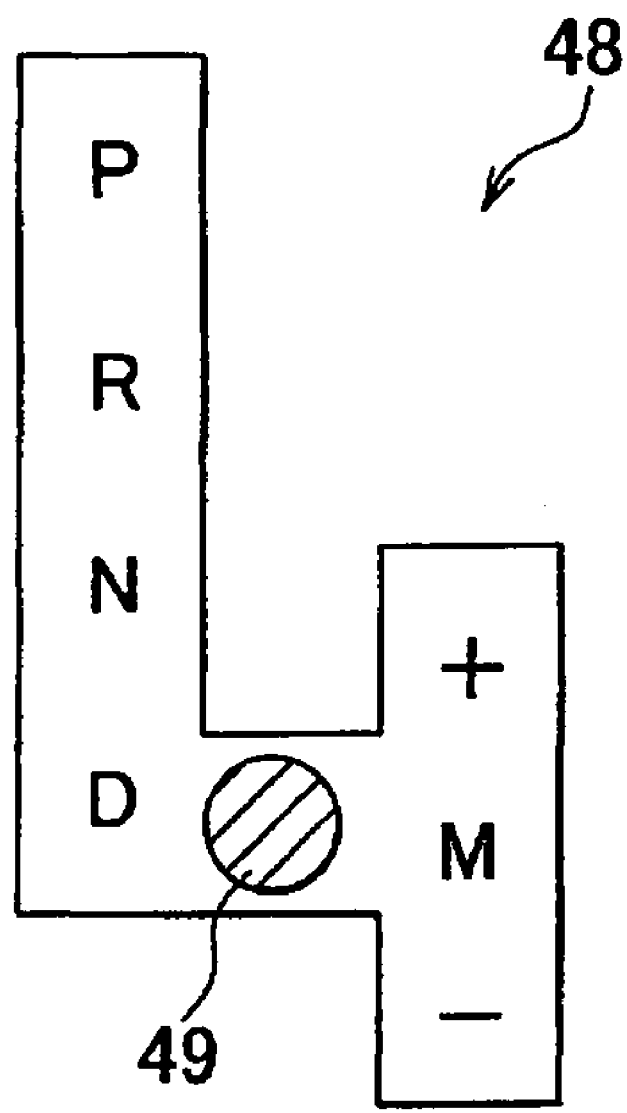
FIG. 5 is a view showing an example of a shift operation device that serves as a switching device used to manually change multiple shift positions $P_{SH}$.

FIG. 5 shows an example of a shift operation device 48 that serves as a switching device that is used to manually select a shift position from among multiple shift positions $P_{SH}$ This shift operation device 48 is arranged, for example, at the side of the driver's seat, and is provided with a shift lever 49 that is operated to select a desired shift position from among multiple shift positions $P_{SH}$. The shift operation device 48 in this example embodiment may be regarded as a switching device according to the invention.

The shift lever 49 is manually operated to a desired position from among the following positions. These positions include the park position "Park", the reverse position "Reverse", the neutral position "Neutral", the automatic shifting forward running position "Drive", and manual shifting forward running position "Manual". When the shift lever 49 is in Park, the neutral state, in which the power transmission path in the automatic transmission of the shift mechanism 10 is interrupted, is achieved, and the output shaft 22 of the automatic shift unit 20 is locked. When the shift lever 49 is in Reverse, the vehicle is allowed to go in reverse. When the shift lever 49 is in Neutral, the shift mechanism 10 in the neutral state in which the power transmission path therein is interrupted. When the shift lever 49 is in Drive, the automatic shift mode, in which the automatic shift control is executed, is achieved. In the automatic shift control, the total gear ratio γT is changed within a certain range. The total gear ratio γT is determined based on the gear ratio of the differential unit 11 and the gear ratio of the automatic shift unit 20 at each gear. The gear ratio of the differential unit 11 is continuously changed in a certain range. The gear of the automatic shift unit 20 is selected from among first gear to fifth gear by the automatic shift control. When the shift lever 49 is in Manual, the manual shift mode (manual mode) is selected to set so-called shift ranges by restricting the use of the high gear(s) of the automatic shift unit 20 that is (are) used in the automatic shift control.

When the shift lever 49 is manually shifted to the selected shift position $P_{SH}$ from among the above-described positions, for example, the state of the hydraulic pressure control circuit 42 is electrically switched to select one of Reverse, Neutral and Drive shown in the operation chart in FIG. 2.

Among the positions Park to Manual, each of the positions Park and Neutral is a non-running position that is selected to stop the vehicle from running. When the shift lever 49 is in Park or Neutral, both of the first clutch C1 and the second clutch C2 are released, as shown in the operation chart in FIG. 2. That is, each of Park and Neutral is a non-drive position. When the shift lever 49 is in Park or Neutral, the power transmission path in the automatic shift unit 20 is placed in the power-transmission interrupted state by releasing the first clutch C1 and the second clutch C2 so that the transmission of the power through the power transmission path is interrupted and therefore the vehicle is not allowed to run. Each of Reverse Drive, and Manual is a running position that is selected to cause the vehicle to run. When the shift lever 49 is in Reverse, Drive, or Manual, at least one of the first clutch C1 and the second clutch C2 is applied as shown in the operation chart in FIG. 2. That is, each of Reverse, Drive and Manual is a drive position. When the shift lever 49 is in Reverse, Drive or Manual, the power transmission path in the automatic shift unit 20 is placed in the power-transmission permitted state by applying the first clutch C1 and/or the second clutch C2 so that the transmission of power through the power transmission path is permitted and the vehicle is allowed to run.

More specifically, when the shift lever 49 is manually shifted from Park or Neutral to Reverse, the state of the power transmission path in the automatic shift unit 20 is switched from the power-transmission interrupted state to the power-transmission permitted state by applying the second clutch C2. When the shift lever 49 is manually shifted from Neutral to Drive, the state of the power transmission path in the automatic shift unit 20 is switched from the power-transmission interrupted state to the power-transmission permitted state by applying at least the first clutch C1. When the shift lever 49 is manually shifted from Reverse to Park or Neutral, the state of the power transmission path in the automatic shift unit 20 is switched from the power-transmission permitted state to the power-transmission interrupted state by releasing the second clutch C2. When the shift lever 49 is manually shifted from Drive to Neutral, the state of the power transmission path in the automatic shift unit 20 is switched from the power-transmission permitted state to the power-transmission interrupted state by releasing the first clutch C1 and the second clutch C2. Note that, each of Neutral and Park in this example embodiment may be regarded as a non-drive position according to the invention, and each of Drive, Reverse and Manual may be regarded as a drive position according to the invention. The term "positions" means not only gears and shift positions but also shift ranges such as Drive and Reverse.

FIG. 6 is a functional block diagram illustrating the main part of the control operation executed by the electronic control unit 40. As shown in FIG. 6, a stepped shift control unit 54 functions as a shift control unit that changes gears of the automatic shift unit 20. For example, the stepped shift control unit 54 determines whether the gears of the automatic shift unit 20 should be changed, based on the vehicle condition indicated by the vehicle speed V and the required torque Tour that should be output from the automatic shift unit 20, using the relationships indicated by solid lines and alternate long and short dash lines (shift diagram, shift map) in FIG. 7 prestored in a storage unit 56. That is, the stepped shift control unit 54 determines the gear to which the automatic shift unit 20 should be shifted, based on the vehicle condition, using the shift diagram. Then, the stepped shift control unit 54 executes an automatic shift control so that the automatic shift unit 20 is shifted to the determined gear. At this time, the stepped shift control unit 54 provides a command to a hydraulic pressure control circuit 70 to apply and/or release the hydraulic frictional application devices other than the switching clutch C0 and the switching brake B0 so that the automatic shift unit 20 is shifted to the determined gear according to, for example, the operation chart in FIG. 2.

When the shift mechanism 10 is in the continuously variable shift mode, that is, when the differential unit 11 is in the differential mode, a hybrid control unit 52 operates the engine 8 efficiently, and controls the gear ratio γ0 of the differential unit 11 that functions as an electric continuously variable transmission, by optimizing the ratio between the drive power supplied from the engine 8 and the drive power supplied from the second electric motor M2, and optimizing the reaction force borne by the first electric motor M1 while the first electric motor M1 generates electricity. For example, the hybrid control unit 52 calculates the target (required) drive power used to drive the vehicle based on the accelerator-pedal operation amount Acc, which indicates the amount of output required by the driver, and the vehicle speed V; calculates the total target drive power based on the target drive power used to drive the vehicle and the required value for charging an electricity storage device; calculates the target drive power output from the engine so that the total target drive power is output from the engine, taking into account a transfer loss, loads placed on auxiliary machines, art assist torque supplied from the second electric motor M2, and the like; and controls the engine speed $N_E$ and the engine torque $T_E$ of the engine 8 to obtain the target drive power, and controls the amount of electricity generated by the first electric motor M1.

The hybrid control unit 52 executes the hybrid control to improve the power performance, the fuel efficiency, and the like, taking into account the gear of the automatic shift unit 20. During this hybrid control, the differential unit 11 functions as an electric continuously variable transmission to coordinate the engine speed $N_E$ and the vehicle speed V, which are set to operate the engine 8 efficiently, and the rotational speed of the transmitting member 18, which is set by the gear of the automatic shift unit 20. That is, the hybrid control unit 52 sets the target value of the total gear ratio γT of the shift mechanism 10 so that the engine 8 operates according to the optimum fuel efficiency curve (fuel efficiency map, relational diagram). The optimum fuel efficiency curve is empirically determined in advance in a two-dimension coordinate that uses the engine speed $N_E$ and the torque $T_E$ output from the engine 8 (engine torque $T_E$) as parameters so that high drivability and high fuel efficiency are achieved when the vehicle is driven in the continuously variable shift mode. The optimum fuel efficiency curve is stored in the hybrid control unit 52. For example, the hybrid control unit 52 sets the target value of the total gear ratio γT of the shift mechanism 10 so that the engine torque $T_E$ and the engine speed $N_E$, at which the drive power output from the engine matches the target drive power (the total target drive power, or the required drive power), are achieved. Then, the hybrid control unit 52 controls the gear ratio γ0 of the differential unit 11 so that the target drive power is obtained, thereby controlling the total gear ratio γT within a range, for example, from 0.5 to 13, in which the total gear ratio γT is allowed to be changed.

At this time, the hybrid control unit 52 supplies the electric energy generated by the first electric motor M1 to an electricity storage device 60 and the second electric motor M2 through an inverter 58. Therefore, although a large part of the drive power output from the engine 8 is mechanically transmitted to the transmitting member 18, the other part of the drive power output from the engine 8 is consumed by the first electric motor M1 to generate electricity. That is, the other part of the drive power output from the engine 8 is converted into electric energy in the first electric motor M1. The electric energy is supplied to the second electric motor M2 through the inverter 58, and the second electric motor M2 is driven. Thus, mechanical energy is transmitted from the second electric motor M2 to the transmitting member 18. The devices related to the process from generation of the electricity to consumption of the electricity in the second electric motor M2 constitute an electric path in which part of the power output from the engine 8 is converted into the electric energy, and the electric energy is converted to the mechanical energy.

Also, the hybrid control unit 52 has a function as an engine output control unit that executes an output control over the engine 8 so that the engine 8 generates the required amount of drive power, by outputting at least one of an instruction for controlling opening/closing of the electronically-controlled throttle valve 96 using the throttle actuator 97, an instruction for controlling the amount of fuel injected by the fuel injection device 98, and timing at which the fuel is injected by the fuel injection device 98 and an instruction for controlling timing at which the air-fuel mixture is ignited by the ignition device 99 such as an igniter, to the engine output control apparatus 43. For example, the hybrid control unit 52 basically executes a throttle control to drive the throttle actuator 97 based on the accelerator-pedal operation amount Acc according to a prestored relational diagram (not shown). That is, the hybrid control unit 52 basically executes the throttle control to increase the throttle-valve opening amount $θ_{TH}$ as the accelerator-pedal operation amount Acc increases.

The solid line A in FIG. 17 is the boundary line between the engine-power cruise range and the motor-power cruise range. The boundary line is used to determine whether the drive power source, which generates the drive power used to start and drive the vehicle, should be changed between the engine 8 and a motor, for example, the second electric motor M2. In other words, the boundary line is used to determine whether the cruise mode should be changed between so-called engine-power cruise mode in which the vehicle is started and driven using the engine 8 as a drive power source, and so-called motor-power cruise mode in which the vehicle is driven using the second electric motor M2 as a drive power source. The pre-stored relational diagram, shown in FIG. 7, which includes the boundary line (indicated by the solid line A) used to determine whether the cruise mode should be changed between the engine-power cruise mode and the motor-power cruise mode, is an example of a drive power, source switching diagram (drive power source map) that is formed of a two-dimensional coordinate system that uses the vehicle speed V and the output torque Tour which is a value related to drive power as parameters. This drive power source switching diagram is prestored along with, for example, the shift diagram (shift map) indicated by the solid lines and the alternate long and short dash lines in FIG. 7 in the storage unit 56.

Figure 7:
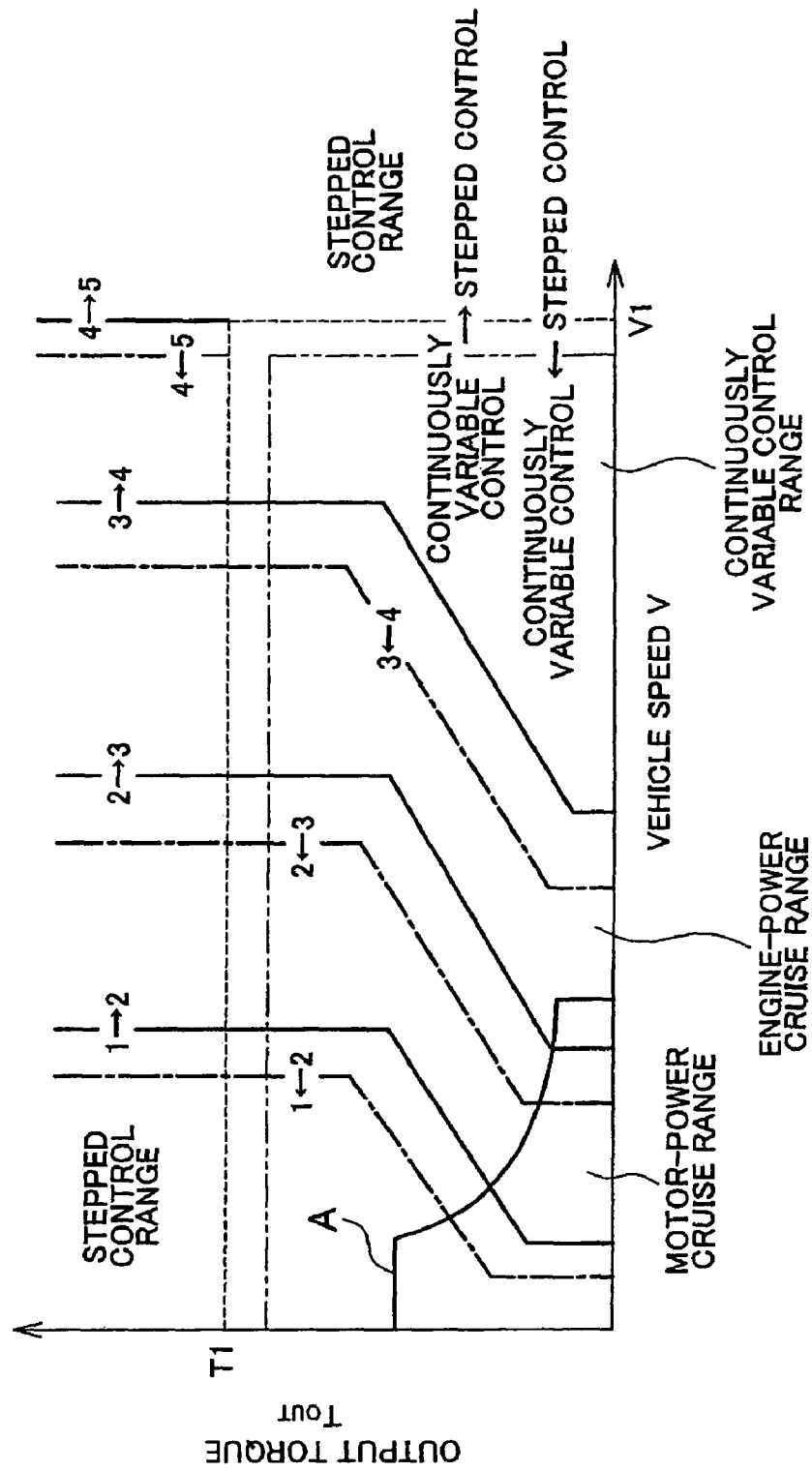
FIG. 7 is a graph showing examples of a shift diagram which is stored in advance and used to determine whether gears of an automatic shift unit should be changed, a switching diagram which is stored in advance and used to determine whether the shift mode of a shift mechanism should be changed, and a drive power source switching diagram which is stored in advance, which includes a boundary line between an engine-power cruise range and a motor-power cruise range, and which is used to determine whether the drive power source should be changed, all of the diagrams being formed on the same two-dimensional coordinate system that uses the vehicle speed and the output torque as parameters, and FIG. 7 also showing the relationship among the shift diagram, the switching diagram and the drive power source switching diagram.

For example, the hybrid control unit 52 determines whether the vehicle condition indicated by the vehicle speed V and the required torque Tour is within the motor-power cruise range or the engine-power cruise range using the drive power source switching diagram shown in FIG. 7. Then, the hybrid control unit 52 drives the vehicle in the motor-power cruise mode or the engine-power cruise mode. As evident from FIG. 7, for example, the hybrid control unit 52 drives the vehicle in the motor-power cruise mode in a low output torque $T_{OUT}$ range, that is, in a low engine torque $T_E$ range where the engine efficiency is generally lower than that in a high torque range, or in a low vehicle speed range where the vehicle speed V is low, that is, a low load range.

Even when the vehicle is driven in the engine-power cruise mode, the hybrid control unit 52 can perform a so-called torque-assist operation to assist the engine 8, by supplying electric energy to the second electric motor M2 from the first electric motor M1 via the electric path, and/or from the electricity storage device 60, and by driving the second electric motor M2. Therefore, the term "engine-power cruise" in this example embodiment also includes the situation where the vehicle is driven by the drive power from the engine and the drive power from the motor.

Also, the hybrid control unit maintains the operating state of the engine 8 using the electric CVT function of the differential unit 11, even when the vehicle is not driven (stopped) or running at a low speed. For example, if the state-of-charge (SOC) of the electricity storage device 60 is reduced and electricity needs to be generated by the first electric motor M1 when the vehicle is not driven (is at a standstill), the first electric motor M1 is driven by the engine 8 to generate electricity and the rotational speed of the first electric motor M1 is increased. Therefore, even if the second electric motor rotational speed $N_{M2}$ which is determined by the vehicle speed V becomes zero (or substantially zero) because the vehicle is at a standstill, the engine speed $N_E$ is maintained at or above the speed that enables the engine 8 to operate under its own power, by using the differential operation of the power split mechanism 16.

A speed-increasing gear determination unit 62 determines whether the gear into which the shift mechanism 10 should be shifted is a speed-increasing gear, for example, fifth gear, according to the shift diagram shown in FIG. 7 prestored in the storage unit 56, based on, for example, the vehicle condition in order to determine which of the switching clutch C0 and the switching brake B0 should be applied when placing the shift mechanism 10 in the stepped shift mode. When the speed-increasing gear is selected, the rotational speed of the output shaft 22 is higher than the rotational speed of the engine 8.

A differential mode switch control unit 50 selectively switches the shift mode between the continuously variable shift mode, i.e., the differential mode, and the stepped shift mode, i.e., the locked mode, by switching the application/release state of the differential mode switching devices (C0, B0) based on the vehicle condition. For example, the differential mode switch control unit 50 determines whether to switch the shift mode of the shift mechanism 10 (differential unit 11) based on the vehicle condition indicated by the required output shaft torque $T_{OUT}$ and the vehicle speed V using the relationship (shift diagram, shift map) indicated by the broken line and the double-chain dash line in FIG. 7, which is prestored in the storage unit 56. That is, the differential mode switch control unit 50 determines the shift mode into which the shift mechanism 10 should be shifted by determining whether the vehicle condition is within the continuously variable control range (differential range) in which the shift mechanism 10 should be placed in the continuously variable shift mode, or in the stepped control range (locked range) in which the shift mechanism 10 should be placed in the stepped shift mode. Then, the differential mode switch control unit 50 switches the shift mode to places the shift mechanism 10 into either the continuously variable shift mode (differential mode) or the stepped shift mode (locked mode), based on the result of determination.

More specifically, if it is determined that the vehicle condition is within the stepped control range, the differential mode switch control unit 50 transmits a signal, based on which the hybrid control or the continuously variable transmission control is not permitted, i.e. prohibited, to the hybrid control unit 52. At the same time, the differential mode switch control unit 50 transmits a signal based on which gears of the automatic shift unit 20 are allowed to be changed, to the stepped shift control unit 54. Then, the stepped shift control unit 54 executes the automatic shift control over the automatic shift unit 20 according to, for example, the shift diagram shown in FIG. 7 that is prestored in the storage unit 56. For example, the operation chart in FIG. 2 that is prestored in the storage unit 56 shows the combinations of the hydraulic friction application devices, i.e., C0, C1, C2, B0, B1, B2, and B3, that are selectively applied to change the gears of the automatic shift unit 20. That is, the entire shift mechanism 10, i.e., the differential unit 11 and the automatic shift unit 20, functions as a so-called stepped automatic transmission, and is shifted to the selected gear according to the operation chart shown in FIG. 2.

For example, when the speed-increasing gear determination unit 62 determines that the shift mechanism 10 should be shifted to fifth gear, a speed-increasing gear, i.e., a so-called overdrive gear, that has a gear ratio of lower than 1.0 should be selected by the entire shift mechanism 10. Therefore, the differential mode switch control unit 50 transmits a command to the hydraulic pressure control circuit 42 to release the switching clutch C0 and apply the switching brake B0 so that the differential unit 11 functions as an auxiliary transmission that has a fixed gear ratio $\gamma 0$ of, for example, 0.7. On the other hand, when the speed-increasing gear determination unit 62 determines that the shift mechanism 10 should be shifted to a gear other than fifth gear, a speed-decreasing gear or a speed-maintaining gear that has a gear ratio of equal to or higher than 1.0 should be selected by the entire shift mechanism 10. Therefore, the differential mode switch control unit 50 transmits a command to the hydraulic pressure control circuit 42 to apply the switching clutch C0 and release the switching brake B0 so that the differential unit 11 functions as an auxiliary transmission that has a fixed gear ratio $\gamma 0$ of, for example, 1. In this way, the differential mode switch control unit 50 places the shift mechanism 10 in the stepped shift mode, and changes the operating states of the switching clutch C0 and the switching brake B0 so that the speed-increasing gear or the speed-decreasing gear (speed-maintaining gear) in that stepped shift mode is selected. Thus, the differential unit 11 functions as an auxiliary transmission. In addition, the automatic shift unit 20 that is connected in tandem with the differential unit 11 functions as a stepped transmission. As a result, the entire shift mechanism 10 functions as a so-called stepped automatic transmission.

However, if it is determined that the vehicle condition is within the continuously variable transmission control range in which the shift mechanism 10 should be shifted to the continuously variable shift mode, the differential mode switch control unit 50 transmits a command to the hydraulic pressure control circuit 42 to release both the switching clutch C0 and the switching brake B0. If both the switching clutch C0 and the switching brake B0 are released, the differential unit 11 is shifted to the continuously variable shift mode and the entire shift mechanism 10 is shifted to the continuously variable shift mode. At the same time, the differential mode switch control unit 50 transmits a signal to the hybrid control unit 52 to allow the hybrid control unit 52 to execute the hybrid control. Also, the differential mode switch control unit 50 provides the stepped shift control unit 54 with a signal to fix the gear at the predetermined gear for the continuously variable shift mode, or a signal to allow the stepped shift control unit 54 to automatically change the gears of the automatic shift unit 20 according to, for example, the shift diagram shown in FIG. 7 which is prestored in the storage unit 56. In this case, the stepped shift control unit 54 executes the automatic shift control by applying or releasing the clutches and the brakes other than the switching clutch C0 and the switching brake B0 according to the operation chart shown in FIG. 2. When the differential unit 11 that is shifted to the continuously variable shift mode by the differential mode switch control unit 50 functions as a continuously variable transmission and the automatic shift unit 20 that is arranged in tandem with the differential unit 11 functions as a stepped transmission, an appropriate amount of drive power is obtained. In addition, the rotational speed that is input to the automatic shift unit 20, which is at one of first gear, second gear, third gear, and fourth gear, is continuously changed so that gear ratio of each gear is allowed to change continuously. Accordingly, the gears are changed while the gear ratio is continuously changed. As a result, the total gear ratio yT which is achieved by the entire shift mechanism 10 is continuously changed.

FIG. 7 will be described in detail below. FIG. 7 shows the relational diagram (shift diagram, shift map) which is prestored in the storage unit 56 and based on which whether the gears of the automatic shift unit 20 should be changed is determined. This shift diagram is formed of a two-dimensional coordinate system that uses the vehicle speed V and the required output torque $T_{OUT}$, which is a value related to the drive power, as parameters. The solid lines in FIG. 7 are upshift lines and the alternate long and short dash lines are downshift lines.

The broken line in FIG. 7 represents the reference vehicle speed V1 and the reference output torque T1 used by the differential mode switch control unit 50 to determine whether the vehicle condition is within the continuously variable control range or the stepped control range. That is, the broke line in FIG. 7 includes both a high vehicle speed determination line and a high output determination line. The high vehicle speed determination line indicates the reference vehicle speed V1 which is a predetermined value that is used to determine whether the vehicle is traveling at a high vehicle speed. The high output determination line indicates the reference output torque T1 which is a predetermined value that is used to determine whether the value related to the drive power required by the hybrid vehicle is high, for example, whether the output torque $T_{OUT}$ from the automatic shift unit 20 should be high. Moreover, there is provided a hysteresis range indicated by the alternate long and two short dash line and the broken line in FIG. 7. The hysteresis range is between the stepped control range and the continuously variable control range. Therefore, the hysteresis effect is produced in the determination as to whether the vehicle condition is within the stepped control range or the continuously variable control range. That is, FIG. 7 shows a prestored switching diagram (switching map, relational diagram), which includes the reference vehicle speed V1 and the reference output torque T1, which uses the vehicle speed V and the output torque $T_{OUT}$ as parameters, and which is used when the differential mode switch control unit 50 determines whether the vehicle condition is within the stepped control range or the continuously variable control range. A shift map that includes this switching diagram may be prestored in the storage unit 56. The switching diagram may include at least one of the reference vehicle speed V1 and the reference output torque T1, or may include a prestored switching line that uses the vehicle speed V or the output torque $T_{OUT}$ as a parameter.

The above-described shift diagram, switching diagram, drive power source switching diagram or the like may be stored in the form of a determination expression for comparing the actual vehicle speed V with the reference vehicle speed V1 and a determination expression for comparing the output torque $T_{OUT}$ with the reference output torque T1 instead of in the form of a map. In this case, the differential mode switch control unit 50 places the shift mechanism 10 in the stepped shift mode, for example, when the actual vehicle speed V (value indicating the vehicle condition) has exceeded the reference vehicle speed V1. Also, the differential mode switch control unit 50 places the shift mechanism 10 in the stepped shift mode when the output torque $T_{OUT}$ (value indicating the vehicle condition) that should be output from the automatic shift unit 20 has exceeded the reference output torque T1.

There may be a failure or a decrease in function of electric control equipment, for example, an electric motor, which is used to have the differential unit 11 function as an electric continuously variable transmission. For example, there may be a decrease in the function of equipment related to the electrical path from generation of electrical energy in the first electric motor M1 to conversion of the electricity into mechanical energy. That is, there may be a failure in the first electric motor M1, the second electric motor M2, the inverter 58, the electricity storage device 60, or the transmission path that connects these devices with each other. Also, the function of the vehicle may be decreased due to a failure or low temperature. In these cases, even if the vehicle condition is within the continuously variable control range, the differential mode switch control unit 50 may preferentially place the shift mechanism 10 in the stepped shift mode in order to reliably keep the vehicle running.

The value related to the drive power described above is a parameter that corresponds one-to-one with the drive power required by the vehicle. This value is not limited to the drive torque or drive power required by the drive wheels 38, but may also be the actual value of, for example, the output torque Tour from the automatic shift unit 20, the vehicle acceleration, or the engine torque $T_E$ that is calculated based on the accelerator depression amount or the throttle valve opening amount $\theta_{TH}$ (or the intake air amount, the air-fuel ratio, or the fuel injection quantity) and the engine speed $N_E$, or an estimated value of, for example, the required drive power, the required (target) output torque $T_{OUT}$ from the automatic shift unit 20, or the required (target) engine torque $T_E$ that is calculated based on, for example, the accelerator pedal depression amount achieved by the driver or the throttle opening amount. The drive torque may be calculated based on, for example, the output torque $T_{OUT}$ with the differential ratio, the radius of the drive wheels 38, etc. taken into account, or may be directly detected using, for example, a torque sensor. The other values may also be calculated or detected in this way.

If the shift mechanism 10 is placed in the continuously variable shift mode when the vehicle is traveling at a high vehicle speed, the fuel efficiency is decreased. In order to avoid such a situation, the reference vehicle speed V1 is set. If the vehicle speed is higher than the reference vehicle speed V1, the shift mechanism 10 is placed in the stepped shift mode. The reference output torque T1 is set based on, for example, the characteristics of the first electric motor M1, which are exhibited when the maximum value of the electric energy is appropriately decreased. In this way, when a large amount of drive power is required to drive the vehicle, a reaction torque from the first electric motor M1 is not required for an engine torque within a high torque range. As a result, the size of the first electric motor M1 is reduced.

Figure 8:
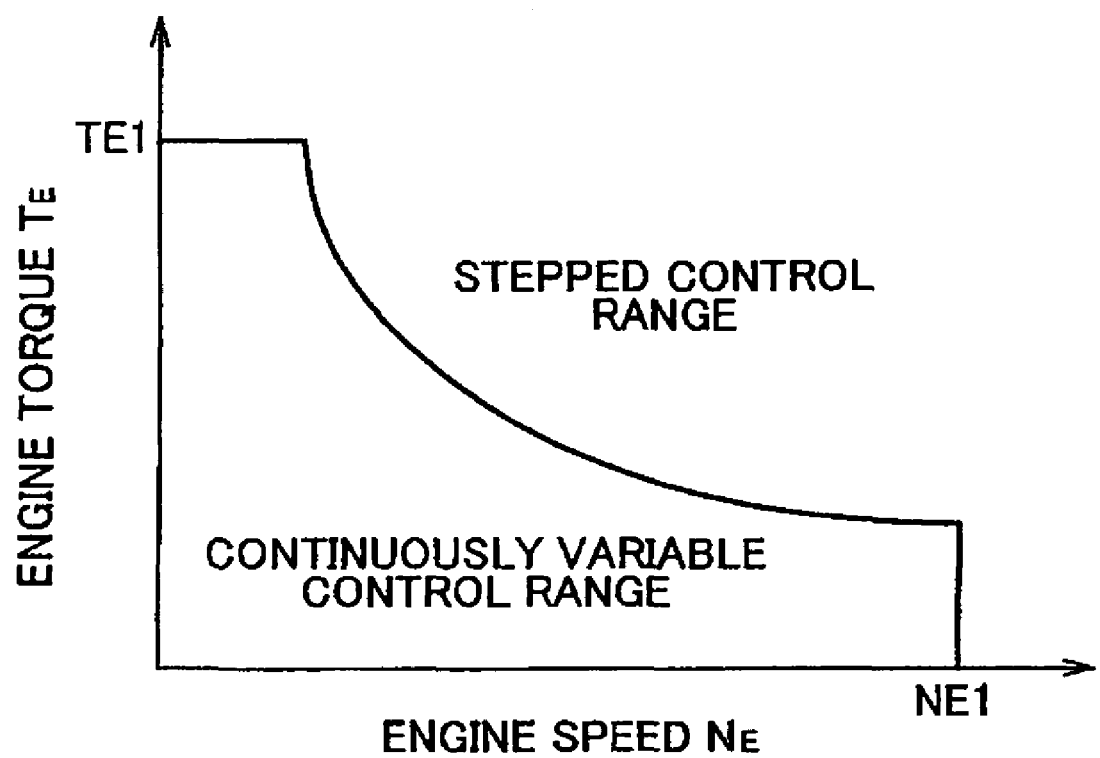
FIG. 8 is a graph showing a pre-stored relational diagram having a boundary line between a continuously variable control range and a stepped control range, and FIG. 8 also being a conceptual diagram for mapping out the boundary between the continuously variable control range and the stepped control range shown by the broken line in FIG. 7.

FIG. 8 is a switching diagram (switching map, relational diagram) that is prestored in the storage unit 56. The switching map uses the engine speed $N_E$ and the engine torque $T_E$ as parameters, and includes an engine output line that is a boundary line which is used when the differential mode switch control unit 50 determines whether the vehicle condition is within the stepped control range (locked range) or the continuously variable control range (differential range). The differential mode switch control unit 50 may determine, based on the engine speed $N_E$ and the engine torque $T_E$, according to the switching diagram in FIG. 8 instead of the switching diagram in FIG. 7, whether the vehicle condition indicated by the engine speed $N_E$ and the engine torque $T_E$ is within the continuously variable control range (differential range) or the stepped control range (locked range). FIG. 8 is also a schematic diagram used to form the broken line in FIG. 7. In other words, the broken line in FIG. 7 is a switching line that is formed on the two-dimensional coordinate system that uses the vehicle speed V and the output torque $T_{OUT}$ as parameters, based on the relational diagram (map) in FIG. 8.

As shown in FIG. 7, the high torque range in which the output torque $T_{OUT}$ is equal to or higher than the predetermined reference output torque T1, and the high vehicle speed range in which the vehicle speed V is equal to or higher than the predetermined reference vehicle speed V1, are used as the stepped control range. Therefore, the shift mechanism 10 is placed in the stepped shift mode when the torque from the engine 8 is relatively high and when the vehicle speed is relatively high. On the other hand, when the torque from the engine 8 is relatively low and when the vehicle speed is relatively low, namely, when the engine 8 is required to produce a drive power within a regular drive powers range, the shift mechanism 10 is placed in the continuously variable shift mode.

Similarly, as shown in FIG. 8, the high torque range in which the engine torque $T_E$ is equal to or higher than a predetermined reference value TE1, a high speed range in which the engine speed $N_E$ is equal to or higher than a predetermined reference value NE1, and a high drive power range in which the drive power output from the engine, which is calculated based on the engine torque $T_E$ and the engine speed $N_E$, is equal to or greater than a predetermined reference value are used as the stepped control range. Therefore, the shift mechanism 10 is placed in the stepped shift mode when the torque output from the engine 8 is relatively high, when the speed of the engine 8 is relatively high, and when the drive power output from the engine 8 is relatively large. On the other hand, when the torque output from the engine 8 is relatively low, when the speed of the engine 8 is relatively low, and when the drive power output from the engine 8 is relatively small, namely, when the engine 8 is required to produce a drive power within the regular drive power range, the shift mechanism 10 is placed in the continuously variable shift mode. The boundary line between the stepped control range and the continuously variable control range in FIG. 8 corresponds to the high vehicle speed reference line that indicates the values used to determine whether the vehicle is traveling at a high speed and the high output reference line used to determine whether a high engine torque is required to be output.

Accordingly, for example, when the vehicle is running at a low or medium speed and when a small or medium amount of drive power is required to drive the vehicle, the shift mechanism 10 is placed in the continuously variable shift mode to maintain favorable fuel efficiency. However, when the vehicle is running at a high speed, for example, when the actual vehicle speed V is higher than the reference vehicle speed V1, the shift mechanism 10 is placed in the stepped shift mode in which it operates as a stepped transmission. In this case, the drive power output from the engine 8 is transmitted to the drive wheels 38 along the mechanical power transmission path. Therefore, it is possible to suppress loss due to conversion between drive power and electric energy, which occurs when the shift mechanism 10 operates as an electric continuously variable transmission. As a result, the fuel efficiency is improved. When a large amount of drive power is required to drive the vehicle, for example, when the value related to the drive power, for example, the output torque $T_{OUT}$, exceeds the reference output torque T1, the shift mechanism 10 is placed in the stepped shift mode in which it operates as a stepped transmission. In this case, the drive power output from the engine 8 is transmitted to the drive wheels 38 along the mechanical power transmission path. Therefore, the shift mechanism 10 is operated as an electric continuously variable transmission only when the vehicle is traveling at a low or medium speed and when a small or medium amount of drive power is required to drive the vehicle. Accordingly, it is possible to decrease the maximum value of the electricity that should be generated by the first electric motor M1, that is, the maximum value of the electricity that should be supplied from the first electric motor M1. As a result, it is possible to further reduce the size of the first electric motor M1 or the vehicle drive system that includes that first electric motor M1.

From another perspective, when a large amount of drive power is required to drive the vehicle, more emphasis is placed on the requirement for the drive power made by the driver than the requirement for the fuel efficiency. Accordingly, the shift mode is switched from the continuously variable shift mode to the stepped shift mode (fixed shift mode).

The hybrid control unit 52 changes a hydraulic pressure supply source, which supplies a hydraulic pressure to the hydraulic pressure control circuit 42, between the mechanical oil pump 44 and the electric oil pump 46. The mechanical oil pump 44 is arranged between the differential unit 11 and the engine 8, and is driven in accordance with the operation of the engine 8. Meanwhile, the electric oil pump 46 is arranged separately from the mechanical oil pump 44. As described above, when the required torque is relatively high or when the vehicle is traveling at a relatively high speed, the vehicle is driven using the engine 8 as a drive power source. At this time, the mechanical oil pump 44 is driven in accordance with the operation of the engine 8. Therefore, the hybrid control unit 52 selects the mechanical oil pump 44 as the hydraulic pressure supply source, which supplies a hydraulic pressure to the hydraulic pressure control circuit 42 of the automatic shift unit 20. On the other hand, when the required torque is relatively low or when the vehicle is traveling at a relatively low speed, the engine 8 is stopped and the vehicle is driven using the second electric motor M2 as a drive power source. At this time, the mechanical oil pump 44 is not operated because the engine 8 is at a standstill. Therefore, the hybrid control unit 52 selects the electric oil pump 46 as the hydraulic pressure supply source, which supplies a hydraulic pressure to the hydraulic pressure control circuit 42.

In the shift mechanism 10 including the automatic shift unit 20 according to the example embodiment of the invention, the gears of the automatic shift unit 20 are changed while the vehicle is traveling using the second electric motor M2 as a drive power source. In such a case, even when the engine 8 is at a standstill, a hydraulic pressure needs to be supplied to the hydraulic pressure control circuit 42. Also, even when the vehicle is at a standstill, the electric oil pump 46 may be driven to supply a predetermined standby hydraulic pressure to the hydraulic pressure control circuit 42 of the automatic shift unit 20 in preparation for a subsequent movement of the vehicle or a movement caused by performing an operation of the shift operation device 48 with the accelerator pedal released, that is, a so-called garage shift operation. Because a torque converter is not provided in the shift mechanism 10 that includes the differential unit 11 according to the example embodiment of the invention, it is not possible to cause the vehicle to creep with the accelerator pedal released. Therefore, for example, the second electric motor M2 is driven to simulate creeping.

A standby hydraulic pressure setting unit 102 presets (determines) the value of a standby hydraulic pressure that is supplied to the hydraulic pressure control circuit 42 of the automatic shift unit 20 in preparation for a subsequent movement of the vehicle or a movement caused by performing an operation of the shift operation device 48 with the accelerator pedal released, that is, a so-called garage shift operation, when the vehicle is at a standstill (not driven). The standby hydraulic pressure setting unit 102 sets the standby hydraulic pressure based on the results of determinations made by an engine stop determination unit 104, a shift position determination unit 106, and a brake operation determination unit 108. The predetermined standby hydraulic pressure is empirically determined in advance. The predetermined standby hydraulic pressure is set to an appropriate value so that a hydraulic pressure is promptly supplied to the hydraulic friction application device of the automatic shift unit 20, which is applied when a garage-shift operation is executed, and the amount of electricity consumed to drive the electric oil pump 46 is suppressed. The standby hydraulic pressure is supplied, via a regulator valve (not shown), and used as the line pressure of the hydraulic pressure control circuit 42. When the standby hydraulic pressure is increased, the line pressure is also increased.

The engine stop determination unit 104 determines whether the engine 8 has been stopped. Whether the engine 8 has been stopped is determined based on, for example, an engine output control command that is output from the hybrid control unit 52. When the engine 8 is stopped, the electric oil pump 46 is driven because the mechanical oil pump 44 is not driven. For example, when the garage-shift operation is performed at a decreased engine speed or immediately after the engine is started after the end of the motor-power cruise, the flow rate of the oil supplied from the mechanical oil pump 44 may be insufficient. Accordingly, the electric oil pump 46 is driven to make up for a shortage in the flow rate of the oil. In such a case, the engine stop determination unit 104 determines that the engine 8 is stopped.

The shift position determination unit 106 determines whether the shift lever 49 of the shift operation device 48 is in Neutral, which is the vehicle non-drive position, or whether the shift lever 49 has shifted from Neutral to Drive, Reverse or Manual, which are the drive positions. The position of the shift lever 49 is determined based on a signal $P_{SH}$ indicating the shift position, which is output from the shift operation device 48.

The brake operation determination unit 108 determines whether a foot brake pedal 68 has been depressed (brakes have been applied). Whether the foot brake pedal 68 has been depressed is determined based on a foot brake pedal operation signal (on-signal) $B_{ON}$ indicating the fact, detected by a brake switch 70, that foot brakes (wheel brakes), which are service brakes, have been applied. The brake operation determination unit 108 determines whether the duration of the time the foot brake pedal 68 is not depressed brakes are released) is shorter than a predetermined duration. More specifically, a timer (not shown) starts counting the time that has elapsed since it is determined that the foot brake pedal 68 is released. Then, the brake operation determination unit 108 determines whether the elapsed time is shorter than the predetermined duration. The predetermined duration is empirically determined in advance, and stored in the storage unit 56.

When the engine stop determination unit 104 determines that the engine 8 has been stopped, the shift position determination unit 106 determines that the shift lever 49 is in Neutral, which is the non-drive position, and the brake operation determination unit 106 determines that the foot brake pedal 68 has been depressed (brakes are applied) or that the duration of time the foot brake pedal 68 is not depressed (brakes are released) is shorter than the predetermined duration, the standby hydraulic pressure setting unit 102 sets (determines) a regular standby hydraulic pressure.

Figure 9:
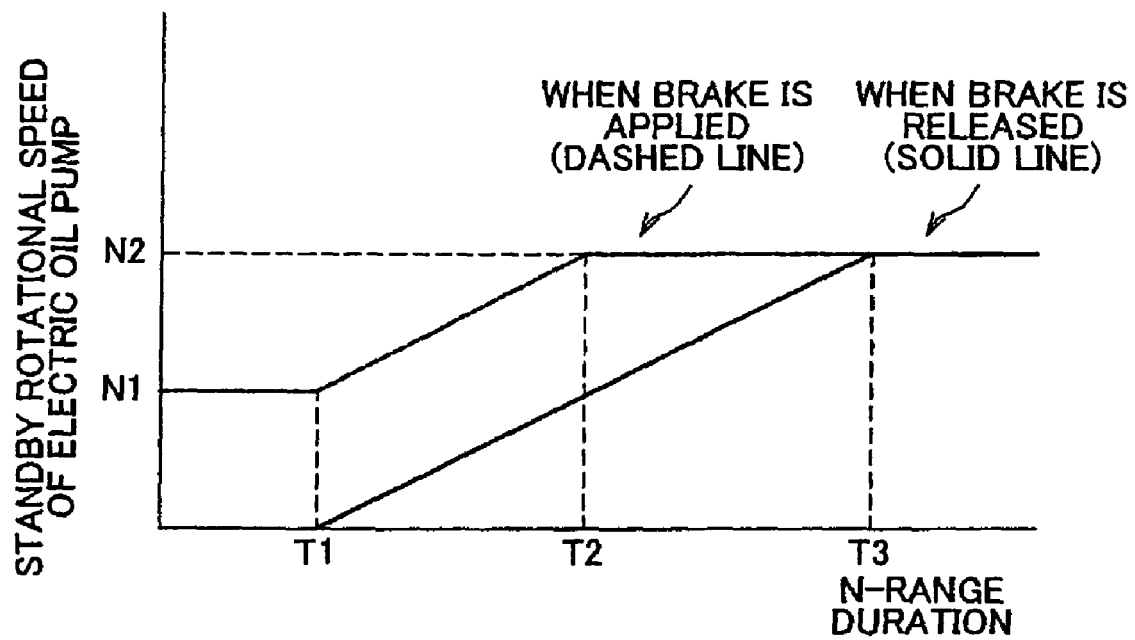
FIG. 9 is a graph showing the relationship between the N-range duration and the standby rotational speed of an electric oil pump.

FIG. 9 shows the relationship between the duration of time the shift position selected in the shift operation device 48 is maintained at Neutral (N-range duration) and the rotational speed of the electric oil pump 46, which is required to achieve the standby hydraulic pressure (hereinafter, referred to as "standby rotational speed of the electric oil pump 46"). The standby rotational speed and the standby hydraulic pressure are in a proportional relationship. Therefore, the standby hydraulic pressure increases as the standby rotational speed of the electric oil pump 46 increases. In FIG. 9, the solid line indicates the above-described relationship when the brakes are released, and the dashed line indicates the relationship when the brakes are applied. When the N-range duration is short, that is, immediately after the shift position selected in the shift operation device 48 is changed to Neutral, there is only a low possibility that the garage-shift operation for changing the shift position from Neutral to Drive or Reverse is performed. Therefore, when the N-range duration is shorter than the predetermined duration T1, the standby rotational speed is set to a low value. When the brakes are applied, it is considered that the driver has an intention to perform the garage-shift operation. Therefore, the standby hydraulic pressure is set to a value that is higher than that when the brakes are released. Thus, a higher standby hydraulic pressure is achieved when the brakes are applied than when the brakes are released. More specifically, during the predetermined duration T1 that starts immediately after the selected shift position is changed to Neutral, the possibility that the garage shift operation will be performed is considerably low when the brakes are released. Therefore, the standby rotational speed is set to zero. On the other hand, when the brakes are applied, it is considered that the driver has an intention to perform the garage-shift operation although the possibility that the garage-shift operation will be performed is low. Therefore, the standby rotational speed is maintained at the standby rotational speed N1 that is higher than that when the brakes are released. Each of the predetermined duration T1 and the standby rotational speed N1 is set to an appropriate value that is empirically determined in advance.

Regardless of whether brakes are applied or released, the possibility that the garage-shift operation will be performed increases as the N-range duration increases. Accordingly, the standby rotational speed is increased in proportional to the N-range duration. More specifically, when the brakes are applied, the standby rotational speed is controlled to change from N1 to N2 during the period from the end of the predetermined duration T1 to the end of the predetermined duration J2. When the brakes are released, the standby rotational speed is controlled to change from zero to N2 during the period from the end of the predetermined duration T1 to the end of the predetermined duration T3. Thus, the standby rotational speed N2 is achieved more quickly when the brakes are applied than when the brakes are released. Therefore, if the garage-shift operation is performed within the predetermined duration 13, the hydraulic friction application device of the automatic shift unit 20 is applied more quickly. As described above, the standby hydraulic pressure setting unit 102 sets the standby hydraulic pressure based on the duration of time the selected shift position is maintained at Neutral. The standby rotational speed N2 is set so that, when the standby rotational speed N2 is achieved, the predetermined standby hydraulic pressure, at which the hydraulic friction application device is quickly applied when the garage-shift operation is performed, is reliably achieved. The predetermined durations T2 and T3, and the standby rotational speed N2, etc. are set to appropriate values that are empirically determined in advance.

An oil amount adjustment unit 110 increases the amount of oil supplied to the hydraulic pressure control circuit 42 by a larger amount as the standby hydraulic pressure is lower when the garage-shift operation is performed. More specifically, the oil amount adjustment unit 110 increases the amount of oil supplied to the hydraulic pressure control circuit 42 by increasing the rotational speed of the electric oil pump 46 and/or the duration of time the electric oil pump 42 is driven at an increased rotational speed. The amount of oil correlated with the standby hydraulic pressure is set to an appropriate value that is determined empirically in advance.

Then, the amount of increase in the rotational speed of the electric oil pump 46 and the duration of time the electric oil pump 46 is driven at an increased rotational speed are controlled so that the predetermined amount of oil is supplied to the hydraulic pressure control circuit 42.

Figure 10:
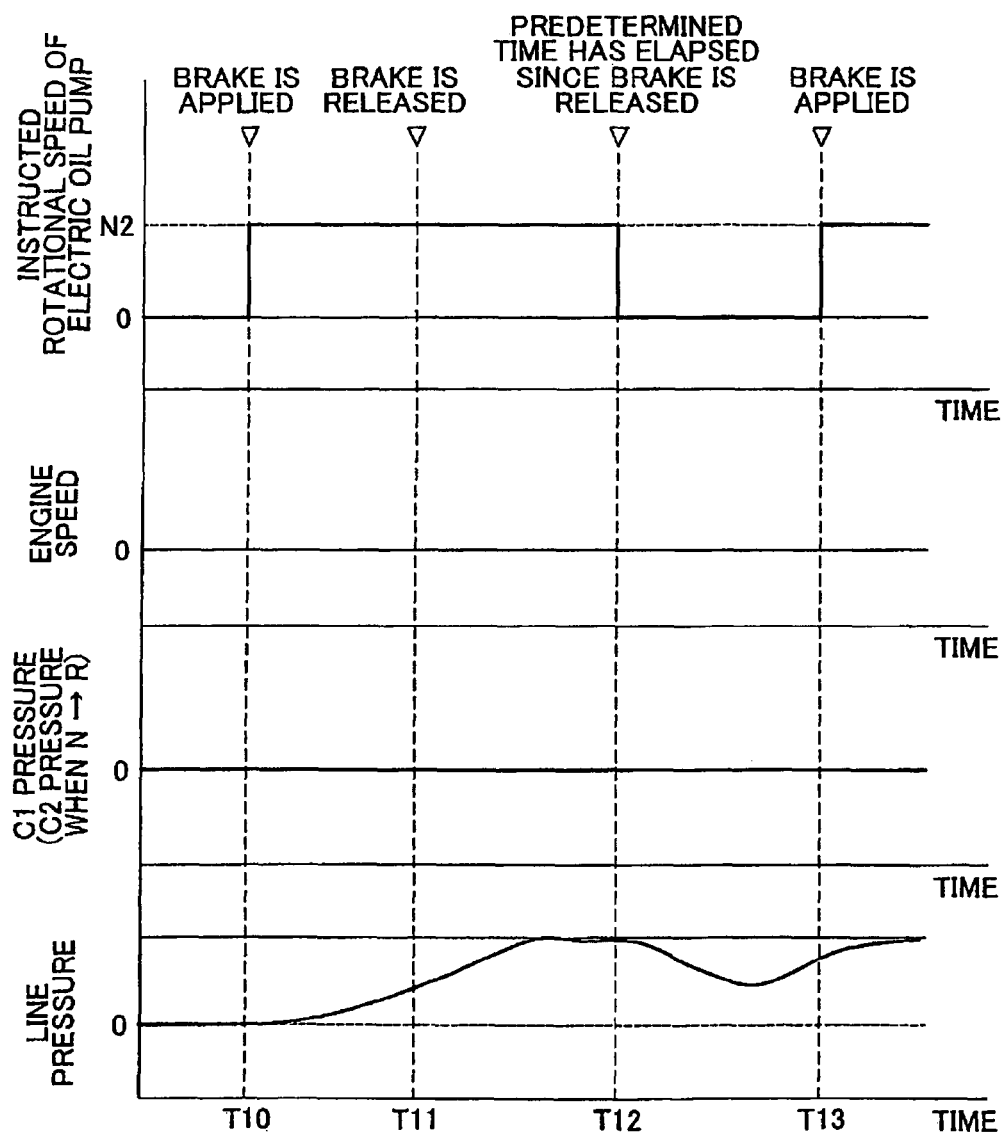
FIG. 10 is a time chart showing the relationship between the instructed rotational speed of the electric oil pump to the brake operation performed when Neutral is selected.

FIG. 10 is a time chart showing the relationship between the instructed rotational speed of the electric oil pump 46 to the brake operation performed when Neutral is selected. The relationship shown in FIG. 10 is derived so that the standby hydraulic pressure set by the standby hydraulic pressure setting unit 102 is achieved. If the brakes are applied at T10, it is considered that the driver has an intention to perform the garage-shift operation. Therefore, the instructed rotational speed of the electric oil pump 46 is maintained at, for example, the standby rotational speed N2 to reliably achieve a predetermined standby hydraulic pressure. Thus, the line pressure of the hydraulic pressure control circuit 42 of the automatic shift unit 20 is gradually increased. If the brakes are released at T11, there still is a possibility that the garage shift operation will be performed immediately after the brakes are released. Therefore, within a predetermined duration after the brakes are released, the rotational speed of the electric oil pump 46 is maintained at the standby rotational speed N2 to reliably achieve the standby hydraulic pressure. Then, when the duration of time the brakes are released is equal to or longer than the predetermined duration, the possibility that the garage-shift operation will be performed is reduced. Therefore, the standby hydraulic pressure is decreased. More specifically, in the example embodiment of the invention, the standby hydraulic pressure is decreased to zero by stopping the electric oil pump 46 to decrease the standby rotational speed to zero. In this way, the amount of electricity consumed by the electric oil pump 46 is suppressed. The line pressure starts decreasing at T12. However, when the brakes are applied at T13, the instructed rotational speed of the electric oil pump 46 is returned to the standby rotational speed N2, which is set at T10, and the line pressure is increased. As described above, the standby hydraulic pressure setting unit 102 sets the standby hydraulic pressure based on the brake operation performed by the driver. The duration of time from when the brakes are released until when the electric oil pump 46 is stopped (predetermined duration) is empirically determined in advance.

Figure 11:
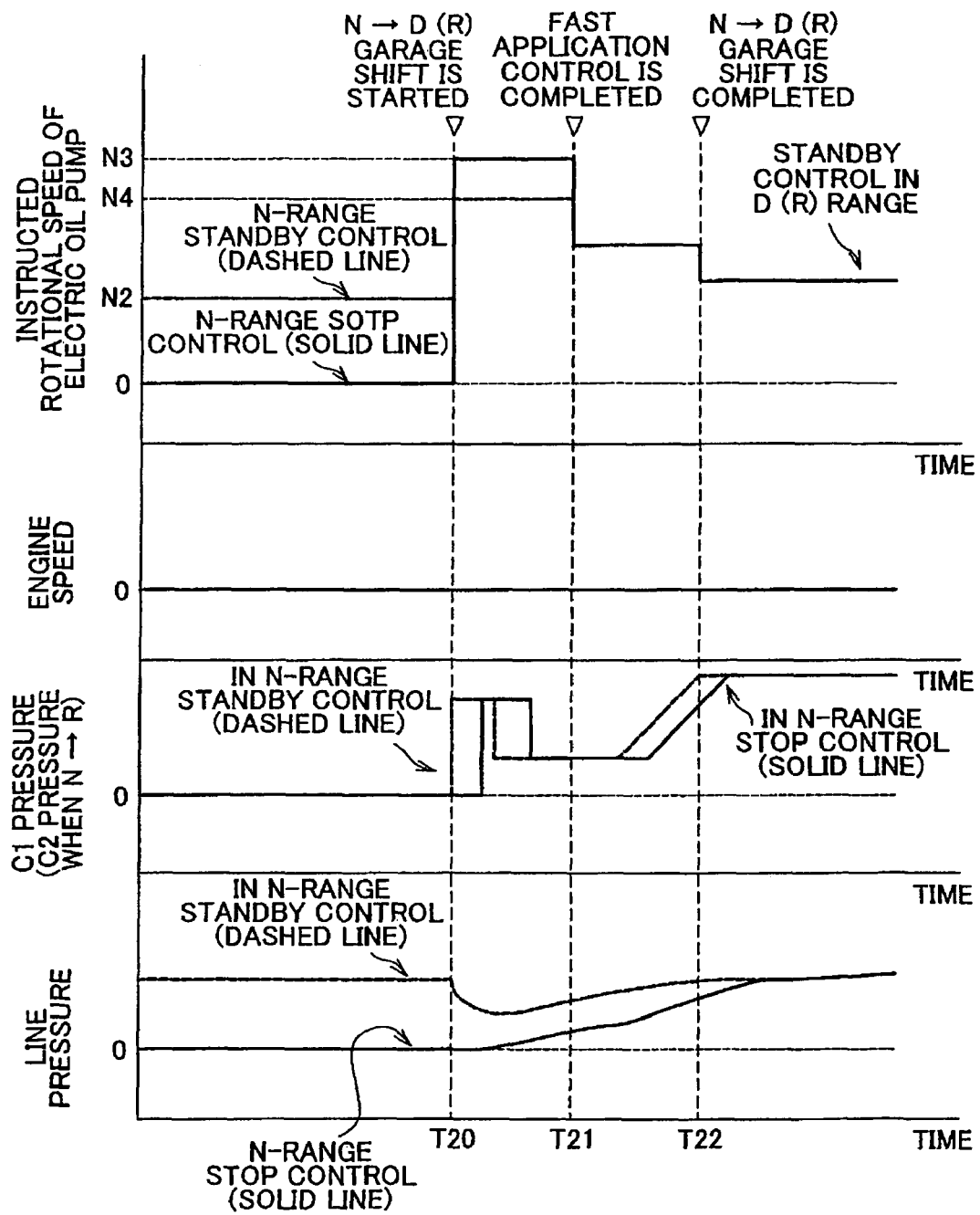
FIG. 11 is a time chart showing the state where the garage-shift operation is performed when a control is executed over the standby hydraulic pressure produced by the electric oil pump in Neutral range, and the state where the garage-shift operation is performed when the electric oil pump is at a standstill in Neutral range.

FIG. 11 is a time chart showing the state where the garage-shift operation is performed when a control is executed over the standby hydraulic pressure produced by the electric oil pump 46 in Neutral range, and the state where the garage-shift operation is performed when the electric oil pump 46 at a standstill in Neutral range. In FIG. 11, the dashed line shows the state where the standby control is executed so that the instructed rotational speed of the electric oil pump 46 is adjusted to the standby rotational speed N2 (N-range standby control). The N-range standby control corresponds to the control that is executed by the standby hydraulic pressure setting unit 102 when the brakes are applied or within the predetermined duration after the brakes are released. The solid line shows the state where the electric oil pump 46 is stopped and the instructed rotational speed thereof is adjusted to zero (N-range stop control). The N-range stop control corresponds to the control that is executed by the standby hydraulic pressure setting unit 102 when the duration of time the brakes are released is equal to or longer than the predetermined duration.

Until T20 in FIG. 11, the shift range is maintained at Neutral regardless of whether the N-range standby control or the N-range stop control is executed. In the N-range standby control, the instructed rotational speed of the electric oil pump 46 is maintained at the standby rotational speed N2. Therefore, the line pressure of the hydraulic pressure control circuit 42 is maintained at a predetermined standby hydraulic pressure. This state until T20 in FIG. 11 corresponds to the state after the end of the predetermined duration T2 indicated by the dashed line in FIG. 9. In the N-range stop control, the instructed rotational speed of the electric oil pump 46 is zero because the electric oil pump 46 is at a standstill. Therefore, the line pressure is maintained at zero. This state until T20 in FIG. 11 corresponds to the state until the end of the predetermined duration T1 indicated by the solid line in FIG. 9.

Next, when a so-called garage-shift operation for changing the shift position from Neutral to Drive or Reverse is started at T20, a so-called fast application control for abruptly increasing the instructed rotational speed of the electric oil pump 46 is started. In the N-range stop control, because the line pressure is zero, the response of the hydraulic friction application devices of the automatic shift unit 20 to the hydraulic pressure is slower than that in the N-range standby control. Therefore, the hydraulic pressure adjustment unit 110 sets the instructed rotational speed of the electric oil pump 46 that should be achieved by the fast application control in the N-range stop control to a value higher than the instructed rotational speed N4 of the electric oil pump 46 that should be achieved by the fast application control in the N-range standby control. In other words, the hydraulic pressure adjustment unit 110 increases the instructed rotational speed of the electric oil pump 46 by a larger amount as the standby hydraulic pressure is lower, for example, as in the N-range stop control, to increase the amount of oil that is supplied to the hydraulic pressure control circuit 42, thereby causing the hydraulic friction application devices of the automatic shift unit 20 to respond to the hydraulic pressure more quickly. The oil amount adjustment unit 110 may increase the amount of oil supplied to the hydraulic pressure control circuit 42 by not only increasing the rotational speed of the electric oil pump 46 but also increasing the duration of time the electric oil pump 46 is rotated at an increased rotational speed (duration from T20 to T21 in FIG. 11), namely, increasing the increased-rotational speed duration. Thus, even when the N-range stop control is executed, the hydraulic friction application devices are allowed to respond to the hydraulic pressure more quickly by raising the line pressure more quickly. The instructed rotational speeds N3 and N4, and the duration of time the electric oil pump 46 is rotated at an increased rotational speed (duration from T20 to T21) are set to appropriate values that are empirically determined in advance.

When the garage-shift operation is started while the N-range stop control is executed, the line pressure rises slowly. Therefore, issuance of a command on the application pressure for applying the target hydraulic friction application device is retarded, whereby slippage of the hydraulic friction application device is suppressed. More specifically, for example, when the garage-shift operation for changing the shift position to Drive is performed, first gear is usually selected. Therefore, the first clutch C1 is applied according to the operation chart in FIG. 2. In this case, the application pressure (instructed pressure) for applying the first clutch C1 is output later when the N-range stop control is executed than when the N-range standby control is executed. Retarding the output of the instructed pressure for applying the first clutch C1 allows the first clutch C1 to be applied after the line pressure is raised to an appropriate value. Therefore, it is possible to supply the application pressure at which slippage of the first clutch C1 does not occur. To select first gear, in addition to the first clutch C1, the third brake B3 is also applied. The similar control is executed on the third brake B3.

After the fast application control is completed at T21, the rotational speed of the electric oil pump 46 is maintained at a predetermined rotational speed regardless of whether the N-range standby control or the N-range stop control is executed. Then, a sweep control is executed on the first clutch C1 during a period from T21 to T22, whereby the first clutch C1 is smoothly applied. The start timing of the sweep control may be later when the N-range stop control is executed than when the N-range standby control is executed. Thus, it is possible to suppress slippage of the first clutch C1 due to slow rising of the line pressure. As a result, the useful life of the first clutch C1 is increased by suppressing such slippage.

Figure 12:
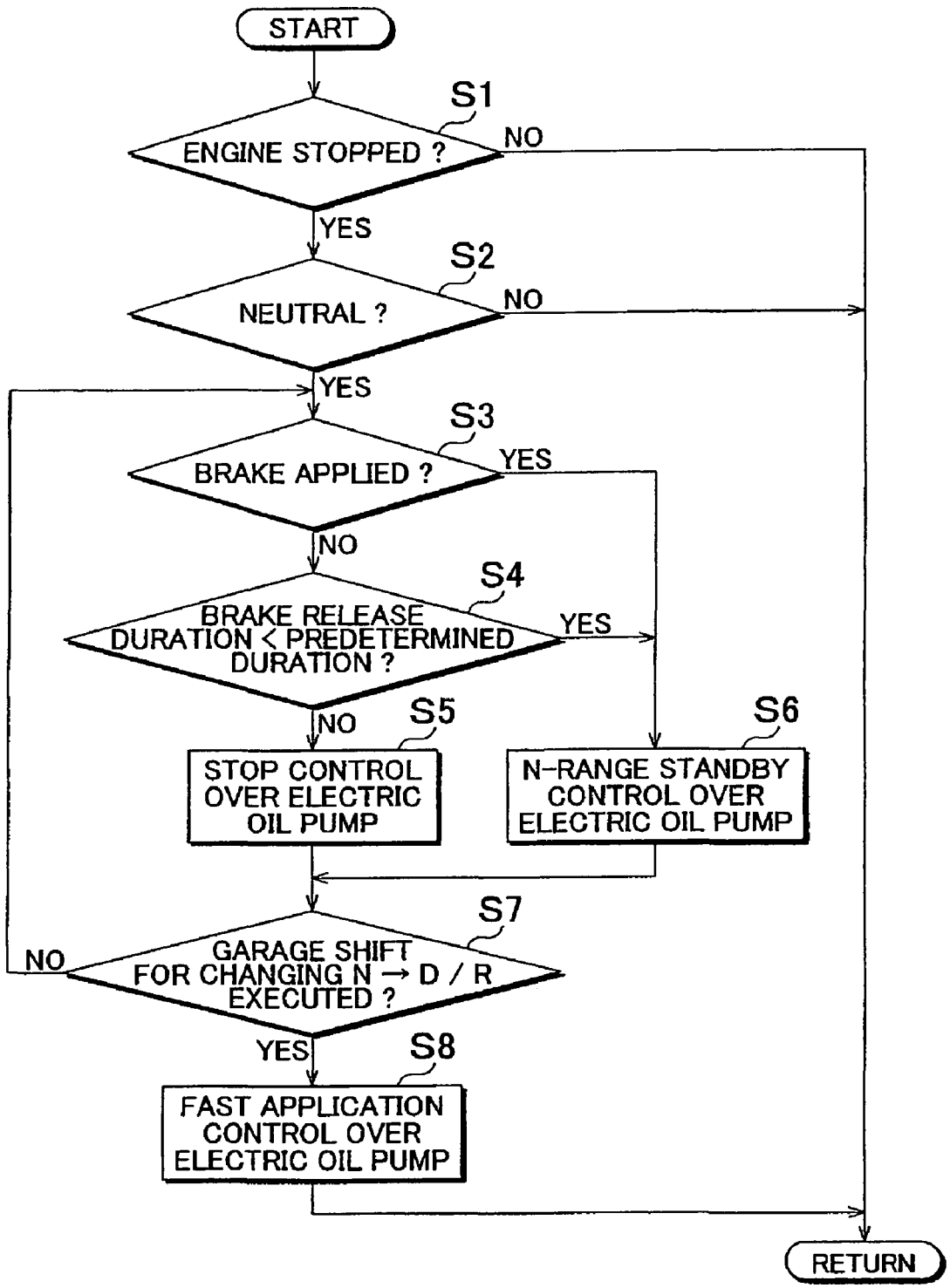
FIG. 12 is a flowchart illustrating the main portion of a control executed by the electronic control unit, that is, a control routine executed over the electric oil pump when a garage-shift operation is executed.

FIG. 12 is a flowchart illustrating the main portion of the control executed by the electronic control unit 40, that is, the control routine executed over the electric oil pump 46 when the garage-shift operation is executed. The control routine is periodically executed at considerably short time intervals of, for example, several milliseconds to several tens of milliseconds.

First, in step (hereinafter, referred to as "S") 1, the engine stop determination unit 104 determines whether the engine 8 has been stopped. For example, when the engine is driven, the control over the electric oil pump 46 is not executed because the required amount of oil is obtained by the mechanical oil pump 44. If it is determined that the engine is driven, a negative determination is made in S1, and the routine ends.

On the other hand, if an affirmative determination is made in S1, S2 is executed by the shift position determination unit 106. In S2, it is determined whether shift lever 49 of the shift operation device 48 is in Neutral, which is the non-drive position. If a negative determination is made in S2, the control routine ends.

On the other hand, if an affirmative determination is made in S2, S3 is executed by the brake operation determination unit 108. In S3, it is determined whether the foot brake pedal 68 has been depressed, that is, the brakes have been applied. If an affirmative determination is made in S3, S6 is executed by the standby hydraulic pressure setting unit 102. In S6, the electric oil pump 46 is rotated at the standby rotational speed to reliably achieve the standby hydraulic pressure, whereby a decrease in the line pressure during the garage-shift operation is suppressed (N-range standby control is executed), because there is a high possibility that the garage-shift operation will be performed. On the other hand, if a negative determination is made in S3, S4 is executed by the brake operation determination unit 108. In S4, it is determined whether the duration of time the brakes are released is shorter than the predetermined duration. If it is determined that the duration of time the brakes are released is shorter than the predetermined duration, there is a high possibility that the garage-shift operation will be performed. Therefore, an affirmative determination is made in S4, and the N-range standby control is executed in S6.

On the other hand, if a negative determination is made in S4, that is, if it is determined that the duration of time the brakes are released is equal to or longer than the predetermined duration, there is only a low possibility that the garage-shift operation will be performed. Therefore, S5 is executed by the standby hydraulic pressure setting unit 102 to suppress the amount of electricity consumed by the electric oil pump 46. In S5, the N-range stop control for stopping the electric oil pump 46 is executed. Then, S7 is executed by the shift position determination unit 106. In S7, it is determined whether the garage-shift operation for changing the shift position from Neutral to Drive or Reverse has been performed. If a negative determination is made in S7, S3 is executed again.

On the other hand, if an affirmative determination is made in S7, S8 is executed by the oil amount adjustment unit 110. In S8, the fast application control is executed. In the fast application control, the fast application instructed rotational speed is determined based on the instructed rotational speed of the electric oil pump 46 to increase the amount of oil. More specifically, when Neutral is selected, the line pressure rises more slowly when the N-range stop control is executed than when the N-range standby control is executed. Therefore, if the N-range stop control is executed, the instructed rotational speed of the electric oil pump 46 is set to a higher value to allow the hydraulic friction application devices to respond to the hydraulic pressure more quickly. Also, the duration of time the fast application control is executed may be increased to allow the hydraulic friction application devices to respond to the hydraulic pressure further quickly.

As described above, according to the example embodiment of the invention, when the garage-shift operation is performed, the amount of oil supplied to the hydraulic friction application devices of the automatic shift unit 20 is adjusted based on the standby hydraulic pressure. In this way, even if the standby hydraulic pressure is increased or decreased, it is possible to achieve the hydraulic pressure required in the garage-shift operation more easily. Therefore, it is possible to increase or decrease the standby hydraulic pressure without reducing the useful life of the automatic shift unit 20 and slowing down the response of the automatic shift unit 20 to the hydraulic pressure. Thus, it is possible to reduce the amount of electric power consumed by the electric oil pump 46, thereby enhancing the fuel efficiency.

According to the example embodiment of the invention, the amount of oil that is supplied to the application devices is increased by a larger amount as the standby hydraulic pressure is lower. Therefore, even when the standby hydraulic pressure is low, it is possible to reliably obtain a sufficient amount of oil that is required when the drive position is changed.

According to the example embodiment of the invention, it is possible to easily increase the amount of oil that is supplied to the application devices of the automatic shift unit 20 by increasing the rotational speed of the electric oil pump 46 and/or the duration of time the electric oil pump 46 is rotated at an increased rotational speed.

In addition, according to the example embodiment of the invention, the output from the electric oil pump 46 is suppressed by decreasing the standby hydraulic pressure when there is only a low possibility that the shift position will be changed from Neutral to Drive or Reverse. As a result, it is possible to suppress electric power consumption.

According to the example embodiment of the invention, it is possible to relatively accurately reflect the drive's intention on the control, because the standby hydraulic pressure is set based on the duration of time the selected shift position is maintained at Neutral and/or the brake operation performed by the driver.

According to the example embodiment of the invention, it is possible to appropriately control the operating state of the shift mechanism 10, because an appropriate hydraulic pressure is supplied to the application devices based on the shift position selected in the shift operation device 48 to appropriately control the applied state of the application devices.

The example embodiment of the invention has been described in detail with reference to the accompanying drawings. However, the invention may be implemented in the following modified examples of the embodiment of the invention.

For example, the shift mechanism 10 according to the example embodiment of the invention is formed of a transmission including the differential unit 11 and the automatic shift unit 20. However, the structure of the transmission is not limited to this. The invention may be applied to a transmission having a structure in which, for example, a belt-type continuously variable transmission is connected to the differential unit 11. In other words, the invention may be applied to any structures including the electric oil pump 46 and a transmission that is driven by the hydraulic pressure supplied from the electric oil pump 46.

In the example embodiment of the invention, the standby rotational speed of the electric oil pump 46 is controlled to zero, when the duration of time the brakes are released is equal to or longer than the predetermined duration. However, it is not absolutely necessary to decrease the standby rotational speed of the electric oil pump 46 to zero. The standby rotational speed may be decreased to an appropriate rotational speed.

In the example embodiment of the invention, the oil amount adjustment unit 110 increases the amount of oil that is supplied to the application devices based on a decrease in the standby hydraulic pressure. Alternatively, the oil amount adjustment unit 110 may decrease the amount of oil that is supplied to the application devices, if the standby hydraulic pressure is high.

In the example embodiment of the invention, the predetermined duration of time the electric oil pump 46 rotated at an increased standby rotational speed is set to an appropriate value empirically determined in advance. Alternatively, the duration of time may be changed on an as needed basis by a learning control.

In the example embodiment of the invention, the second electric motor M2 is directly connected to the transmitting member 18. However, the position of the second electric motor M2 is not limited to this. For example, the second electric motor M2 may be connected to the power transmission path, at any position, from the differential unit 11 to the drive wheels 38 directly or via, for example, a transmission.

In the example embodiment of the invention, the differential unit 11 functions as an electric continuously variable transmission of which the gear ratio $\gamma 0$ is continuously changed within the gear ratio range from the minimum value $\gamma 0 min$ to the maximum value $\gamma 0 max$. However, the invention may be applied even when the gear ratio $\gamma 0$ is changed not continuously but in a stepwise manner using a differential effect.

In the power split mechanism 16 according to the example embodiment of the invention, the first carrier CA1 is connected to the engine 8, the first sun gear S1 is connected to the first electric motor M1, and the first ring gear R1 is connected to the transmitting member 18. However, the manner in which these members are connected to each other is not limited to this. The engine 8, the first electric motor M1 and the transmitting member 18 may be connected to any of the three rotating elements CA1, S1 and R1 of the first planetary gear unit 24.

In the example embodiment of the invention, the engine 8 is directly connected to the input shaft 14. However, the engine need not be directly connected to the input shaft 14. For example, the engine 8 may be operatively connected to the input shaft 14 via a gear or a belt. In addition, the engine 8 need not be provided coaxially with the input shaft 14.

In the example embodiment of the invention, the first electric motor M1 and the second electric motor M2 are provided coaxially with the input shaft 14, the first electric motor M1 is connected to the first sun gear S1, and the second electric motor M2 is connected to the transmitting member 18. However, these members need not be arranged in this way. For example, the first electric motor M1 may be connected to the first sun gear S1 via a gear, a belt or a reducer, and the second electric motor M2 may be connected to the transmitting member 18 via a gear, a belt or a reducer.

In the example embodiment of the invention, the automatic shift unit 20 is connected in tandem with the differential unit 11 via the transmitting member 18. Alternatively, a counter shaft may be provided in parallel with the input shaft 14, and the automatic shift unit 20 may be provided coaxially with the counter shaft. In this case, the differential unit 11 and the automatic shift unit 20 may be connected to each other via paired counter gears, paired transmitting members that are a sprocket and a chain, which serve as the transmitting member 18 so that drive power is transmitted from the differential unit to the automatic shift unit 20.

The power split mechanism 16, which serves as a differential mechanism according to the example embodiment of the invention, may be a differential gear unit in which pinions that are rotated by the engine and paired bevel gears meshed with the pinions are operatively connected to the first electric motor M1 and the transmitting member 18 (second electric motor M2).

The power split mechanism 16 according to the example embodiment of the invention is formed of one set of planetary gear unit. Alternatively, the power split mechanism 16 may be formed of two or more sets of planetary gear units, and may function as a transmission having three or more gears in the non-differential mode (fixed shift mode). In addition, the planetary gear unit is not limited to a single pinion planetary gear unit, and may be a double pinion planetary gear unit. Even when the power split mechanism 16 is formed of two or more sets of planetary gear units, the engine 8, the first and second electric motors M1 and M2, and the transmitting member 18 (and the output shaft 22 when a certain structure is employed) are connected to the rotating elements of the planetary gear units so that drive power is transmittable, and the shift operation is changed between the stepped shift operation and the continuously variable shift operation by controlling the clutch C and the brake B that are connected to the rotating elements of the planetary gear units.

In the example embodiment of the invention, the engine 8 and the differential unit 11 are directly connected to each other. However, the engine 8 and the differential unit 11 need not be directly connected to each other. The engine 8 and the differential unit 11 may be connected to each other via a clutch.

The shift operation device 48 according to the example embodiment of the invention is provided with the shift lever 49 that is operated to select a shift position $P_{SH}$ from among multiple shift positions $P_{SH}$. However, instead of the shift lever 49, a switch, for example, a push-button switch or a slide switch that selects a shift position $P_{SH}$ from among multiple shift positions $P_{SH}$, a device that changes multiple shift positions $P_{SH}$ in response to voice of the driver instead of being manually operated, or a foot-operated device that changes multiple shift positions $P_{SH}$ may be employed. A shift range is set by operating the shift lever 49 to Manual. Alternatively, gear may be set, namely, the highest gear within each shift range may be set by operating the shift lever 49 to Manual. In this case, the gears of the automatic shift unit 20 is changed to shift the automatic shift unit 20 to a desired gear. For example, when the shift lever 49 is manually operated to the upshift position "+" or the downshift position "−" in Manual, the automatic shift unit 20 is shifted to one of first gear to fourth gear in accordance with the operation of the shift lever 49.

The example embodiment of the invention that has been disclosed in the specification is to be considered in all respects as illustrative and not restrictive. The invention may be implemented in various other embodiments that are derived based on the knowledge of those who are skilled in the art.

What is claimed is:

1. An electric oil pump control apparatus for a vehicle that includes: an application device; an electric oil pump that supplies a hydraulic pressure to the application device; and a switching device in which a shift position is selectively changed between a drive position for placing a vehicle in a driven state and a non-drive position for placing the vehicle in a non driven state, the electric oil pump control apparatus comprising:
a standby hydraulic pressure setting unit that presets at least one of a rotational speed of the electric oil pump and a standby hydraulic pressure which is supplied to the application device when the vehicle is at a standstill; and
an oil amount adjustment unit that adjusts an amount of oil which is supplied to the application device when it is predicted or determined that the shift position is changed between the non-drive position and the drive position in the switching device,
wherein the oil amount adjustment unit adjusts the amount of oil that is supplied to the application device based on the standby hydraulic pressure.

2. The electric oil pump control apparatus according to claim 1, wherein, when it is predicted or determined that the shift position is changed from the non-drive position to the drive position in the switching device, the oil amount adjustment unit increases the amount of oil that is supplied to the application device by a larger amount as the standby hydraulic pressure is lower.

3. The electric oil pump control apparatus according to claim 2, wherein changing of the shift position from the non-drive position to the drive position in the switching device is a garage-shift operation.

4. The electric oil pump control apparatus according to claim 2, wherein the oil amount adjustment unit adjusts at least one of a rotational speed of the electric oil pump and a duration of time the electric oil pump is rotated at an increased rotational speed.

5. The electric oil pump control apparatus according to claim 4, wherein the oil amount adjustment unit adjusts at least one of the rotational speed of the electric oil pump and the duration of time the electric oil pump is rotated at an increased rotational speed based on a AT fluid temperature.

6. The electric oil pump control apparatus according to claim 1, wherein the standby hydraulic pressure setting unit decreases at least one of the rotational speed of the electric oil pump and the standby hydraulic pressure when there is a low possibility that the shift position is changed from the non-drive position to the drive position in the switching device.

7. The electric oil pump control apparatus according to claim 1, wherein the standby hydraulic pressure setting unit sets at least one of the rotational speed of the electric oil pump and the standby hydraulic pressure based on at least one of a duration of time the selected shift position is maintained at the non-drive position and whether a brake is applied.

8. The electric oil pump control apparatus according to claim 7, wherein the standby hydraulic pressure setting unit sets at least one of the rotational speed of the electric oil pump and the standby hydraulic pressure to a higher value when the brake is applied than when the brake is released.

9. The electric oil pump control apparatus according to claim 7, wherein the standby hydraulic pressure setting unit sets at least one of the rotational speed of the electric oil pump and the standby hydraulic pressure to a higher value as a duration of time the brake is applied is longer.

10. The electric oil pump control apparatus according to claim 7, wherein the standby hydraulic pressure setting unit sets at least one of the rotational speed of the electric oil pump and the standby hydraulic pressure to a higher value as the duration of time the selected shift position is maintained at the non-drive position is longer.

11. The electric oil pump control apparatus according to claim 7, wherein the standby hydraulic pressure setting unit sets at least one of the rotational speed of the electric oil pump and the standby hydraulic pressure to a lower value when a duration of time the brake is released is equal to or longer than a predetermined duration.

12. The electric oil pump control apparatus according to claim 11, wherein the standby hydraulic pressure setting unit sets at least one of the rotational speed of the electric oil pump and the standby hydraulic pressure to a higher value when the brake is applied after release of the brake.

13. The electric oil pump control apparatus according to claim 1, wherein the standby hydraulic pressure setting unit retards by a large amount a supply of hydraulic pressure to the application device as the standby hydraulic pressure is set lower.

14. The electric oil pump control apparatus according to claim 1, wherein the application device is included in a shift mechanism, and an application state of the application device is controlled based on the shift position selected in the switching device.

15. The electric oil pump control apparatus according to claim 1, wherein when an engine is running, the oil amount adjustment unit stops adjusting the amount of oil that is supplied to the application device based on the standby hydraulic pressure.

16. The electric oil pump control apparatus according to claim 1, wherein the electric oil pump supplies the hydraulic pressure to a forward application device that establishes drive gear or to a reverse application device that establishes reverse gear.

17. An electric oil pump control method for a vehicle that includes: an application device; an electric oil pump that supplies a hydraulic pressure to the application device; and a switching device in which a shift position is selectively changed between a drive position for placing a vehicle in a driven state and a non-drive position for placing the vehicle in a non-driven state, the electric oil pump control method comprising:
presetting at least one of a rotational speed of the electric oil pump and a standby hydraulic pressure that is supplied to the application device when the vehicle is at a standstill;
predicting or determining whether the shift position is changed between the non-drive position and the drive position in the switching device;
adjusting an amount of oil that is supplied to the application device depending on a result of prediction or determination as to whether the shift position is changed between the non-drive position and the drive position in the switching device; and
adjusting the amount of oil that is supplied to the application device based on the standby hydraulic pressure.

18. A shift apparatus for a vehicle, comprising:
an application device that changes a shift mode;
an electric oil pump that supplies a hydraulic pressure to the application device;
a switching device in which a shift position is selectively changed between a drive position for placing a vehicle in a driven state and a non-drive position for placing the vehicle in a non-driven state; and
a controller that presets at least one of a rotational speed of the electric oil pump and a standby hydraulic pressure which is supplied to the application device when the vehicle is at a standstill, and that adjusts an amount of oil which is supplied to the application device based on the standby hydraulic pressure when it is predicted or determined that the shift position is changed between the non-drive position and the drive position in the switching device.

* * * * *